(12) United States Patent
Kim et al.

(10) Patent No.: US 8,958,851 B2
(45) Date of Patent: Feb. 17, 2015

(54) MOBILE TERMINAL AND METHOD OF DISPLAYING INFORMATION THEREIN

(75) Inventors: Dongwoo Kim, Goyang-si (KR); Hyunah Cho, Goyang-si (KR); Ki Seo Kim, Seoul (KR); Hyehyun Kim, Seoul (KR); Kyung Sakong, Seoul (KR)

(73) Assignee: LG Electronics Inc., Seoul (KR)

( * ) Notice: Subject to any disclaimer, the term of this patent is extended or adjusted under 35 U.S.C. 154(b) by 803 days.

(21) Appl. No.: 13/205,273

(22) Filed: Aug. 8, 2011

(65) Prior Publication Data

US 2012/0165075 A1 Jun. 28, 2012

Related U.S. Application Data

(60) Provisional application No. 61/425,755, filed on Dec. 22, 2010.

(30) Foreign Application Priority Data

Feb. 28, 2011 (KR) ........................ 10-2011-0018237

(51) Int. Cl.
  *H04B 1/38* (2006.01)
  *G06F 9/44* (2006.01)
  *G06F 3/048* (2013.01)

(52) U.S. Cl.
  CPC .............. *G06F 9/4443* (2013.01); *G06F 3/048* (2013.01)
  USPC ....................................... 455/566; 455/550.1

(58) Field of Classification Search
  USPC ................ 455/550.1, 566; 715/778, 764, 765
  See application file for complete search history.

(56) References Cited

U.S. PATENT DOCUMENTS

| | | | |
|---|---|---|---|
| 2006/0080640 | A1 | 4/2006 | Cheng et al. |
| 2008/0034314 | A1 | 2/2008 | Louch et al. |
| 2008/0303842 | A1* | 12/2008 | Okamoto et al. ............. 345/629 |
| 2008/0318616 | A1 | 12/2008 | Chipalkatti et al. |
| 2009/0111517 | A1* | 4/2009 | Chen .......................... 455/556.2 |
| 2010/0137035 | A1 | 6/2010 | Shan et al. |
| 2010/0293543 | A1 | 11/2010 | Erhart et al. |
| 2012/0240236 | A1* | 9/2012 | Wyatt et al. ..................... 726/25 |

FOREIGN PATENT DOCUMENTS

| | | |
|---|---|---|
| CN | 101615123 A | 12/2009 |
| CN | 101754458 A | 6/2010 |
| CN | 101888401 A | 11/2010 |
| EP | 2 003 832 A1 | 12/2008 |
| EP | 2 056 568 A1 | 5/2009 |
| EP | 2 175 367 A2 | 4/2010 |
| GB | 2 360 914 A | 10/2001 |

* cited by examiner

*Primary Examiner* — Ajit Patel
(74) *Attorney, Agent, or Firm* — Birch, Stewart, Kolasch & Birch, LLP

(57) ABSTRACT

A mobile terminal including a communication unit configured to communicate with at least one other terminal; a memory configured to store at least first and second operating systems including at least first and second modes, respectively; a controller configured to execute the first operating system, and to activate the first mode corresponding to the first operating system; and a display unit configured to display a first information screen corresponding to the activated first mode. Further, the first information screen includes first application information corresponding to the first mode and second application information corresponding to the second mode and an identifier identifying the first and second application information.

18 Claims, 59 Drawing Sheets

|                | P mode | — 501 |
| Schedule 1 |
| Contents | ———— |
| Participants | ———— — 931 |
| Time | ———— — 932 |
| OK |

(a)

|                | B mode | — 502 |
| Schedule 2 |
| Contents | ———— |
| Participants | ———— — 941 |
| Time | ———— — 942 |
| Notifications | E-mail sending — 943 |
| OK |

|   |   |   |   |
|---|---|---|---|
| A | B | C | D |
| E | . . | . . | . . |
| . . | . . | . . | . . |
| . . | . . | . . | Z |

P mode (a)

|   |   |   |   |   |   |
|---|---|---|---|---|---|
| Q | W | E | . . | . . | P |
| A | S | . . | . . | . . | L |
| Z | X | . . | . . | . . | M |
| 1 | 2 | . . | . . | . . | O |

B mode (b)

| | | February | | | | |
|---|---|---|---|---|---|---|
| ◁ | | | | | | ▷ |

| | 1 | 2 | 3 | 4 | 5 | 6 |
|---|---|---|---|---|---|---|
| | P 1 | | B 1 | | | |
| 7 | 8 | 9 | 10 | 11 | 12 | 13 |
| | P 2 | | | | P 3 | |
| | B 2 | | B 3 | | B 4 | |

| Schedule management | | |
|---|---|---|
| ◁ | February | ▷ |
| Day 1 | | |
| P 1 | ( AM 10 ~ AM 11 ) | |
| Day 3 | | |
| B 1 | ( PM 1 ~ PM 3 ) | |
| Day 8 | | |
| P 2 | ( PM 1 ~ PM 2 ) | |
| B 2 | ( PM 1 ~ PM 3 ) | |
| ⋮ | | |

(a)

| Schedule management |
|---|
| B3 schedule |
| Date |
| 2011 . 2 . 10 . PM 3 ~ PM 5 |
| Meeting room |
| 3rd meeting room |
|  |

| | | February | | | | |
|---|---|---|---|---|---|---|
| | 1 | 2 | 3 | 4 | 5 | 6 |
| | B 5 | | B 1 | | | |
| 7 | 8 | 9 | 10 | 11 | 12 | 13 |
| | P 2 | | | | P 3 | |
| | B 2 | | B 3 | | B 4 | |

Schedule management

FIG. 22A

| Schedule management | | |
|---|---|---|
| ◁ | February | ▷ |
| Day 1 | | |
| P 1 | | |
| Day 3 | | |
| B 1 | | |
| Day 8 | | |
| P 2 | | |
| B 2 | | |

P2 (PM 1 ~ PM 2) and B2 (PM 1 ~ PM 3) are overlapped.
Delete  [P2] [B2]
Modify  [P2] [B2]
[OK]

FIG. 22B

| Schedule management | |
|---|---|
| ◁ February ▷ | |
| Day 1 | |
| P 1 | ( AM 10 ~ AM 11 ) |
| Day 3 | |
| B 1 | ( PM 1 ~ PM 3 ) |
| Day 8 | |
| B 2 | ( PM 1 ~ PM 3 ) |

FIG. 22C

| Schedule management | | | |
|---|---|---|---|
| ◁ | February | | ▷ |
| Day 1 | | | |
| P 1 | ( AM 10 ~ AM 11 ) | | |
| Day 3 | Time of B2 is modified. | | |
| B 1 | PM  3 ⇕  From | | |
| Day 8 | PM  5 ⇕  To | | |
| P 2 | OK | | |
| B 2 | | | |
| ⋮ | | | |

(a)

| Schedule management | |
|---|---|
| ◁  February  ▷ | |
| Day 1 | |
| P 1 | ( AM 10 ~ AM 11 ) |
| Day 3 | |
| B 1 | ( PM 1 ~ PM 3 ) |
| Day 8 | |
| P 2 | ( PM 1 ~ PM 2 ) |
| B 2 | ( PM 3 ~ PM 5 )  ← 2210 |
| ⋮ | |

| | Email writing | |
|---|---|---|
| To | Counterpart 1 (P) Counterpart 2 (B) | |
| Attachment | Document 1 (B) | |

Hello?
Count
partici

Counterpart 1 is currently in email non-receivable state.
Send message converted from email?

Yes | No

SEND (a)

(b)

MOBILE TERMINAL AND METHOD OF DISPLAYING INFORMATION THEREIN

Pursuant to 35 U.S.C. §119(e), this application claims the benefit of U.S. Provisional Application Ser. No. 61/425,755 filed on Dec. 22, 2010 which is hereby incorporated by reference as if fully set forth herein. Pursuant to 35 U.S.C. §119(a), this application claims the benefit of earlier filing date and right of priority to Korean Application No. 10-2011-0018237, filed on Feb. 28, 2011, the contents of which are hereby incorporated by reference herein in their entirety.

BACKGROUND OF THE INVENTION

1. Field of the Invention

The present invention relates to a mobile terminal, and more particularly, to a mobile terminal and method of displaying information therein. Although the present invention is suitable for a wide scope of applications, it is particularly suitable for implementing a plurality of modes.

2. Discussion of the Related Art

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

Recently, a mobile terminal tends to be used for a business need as well as a personal need. In addition, it is necessary to implement the mobile terminal suitable for both of the personal need and the business need. Moreover, the demand for using the mobile terminal for the purpose of the personal need or the business need separately keeps rising.

However, a mobile terminal according to a related art fails in providing an environment in which the mobile terminal can be separately used for the purpose of the personal need or the business need.

SUMMARY OF THE INVENTION

Accordingly, the present invention is directed to a mobile terminal and method of displaying information therein that substantially obviate one or more problems due to limitations and disadvantages of the related art.

An object of the present invention is to provide a mobile terminal and method of displaying information therein, by which a plurality of modes can be implemented and activated for user's convenience and data security in a manner of being discriminated from each other.

Another object of the present invention is to provide a mobile terminal and method of displaying information therein, by which whether information related to a running application corresponds to either a first mode or a second mode can be identifiably displayed when running an application in an activated state of either the first mode or the second mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to an embodiment of the present invention includes at least one operating system capable of implementing a plurality of modes including a first mode and a second mode, at least one application running in at least one of a plurality of the modes, a display unit displaying information related to the application, and a controller running the application in an activated state of either the first mode and the second mode, the controller controlling the display unit to display the information related to the running application in a manner of identifiably displaying a mode which the information related to the running application corresponds to.

In another aspect of the present invention, a method of displaying information in a mobile terminal, which implements a plurality of modes including a first mode and a second mode, includes the steps of activating a prescribed one of the first mode and the second mode, running an application in an activated state of the prescribed mode, determining whether information related to the application corresponds to either the first mode or the second mode, and displaying the information related to the application in a manner of identifiably displaying a mode to which the information related to the application corresponds in accordance with a result of the determining step. Moreover, the mobile terminal includes at least one operating system capable of implementing a plurality of the modes and at least one application executable in at least one of a plurality of the modes.

In still another aspect, the present invention provides a mobile terminal including a communication unit configured to communicate with at least one other terminal; a memory configured to store at least first and second operating systems including at least first and second modes, respectively; a controller configured to execute the first operating system, and to activate the first mode corresponding to the first operating system; and a display unit configured to display a first information screen corresponding to the activated first mode. Further, n the first information screen includes first application information corresponding to the first mode and second application information corresponding to the second mode and an identifier identifying the first and second application information. The present invention also provides a corresponding method of controlling a mobile terminal.

Accordingly, the present invention provides the following effects and/or advantages.

First of all, when an application is run in an activated state of either a first mode or a second mode, the present invention can provide information related to each of the first mode and the second mode as information related to the corresponding application, thereby providing a user with the information corresponding to a currently deactivated mode as well as the information corresponding to a currently activated mode.

Secondly, the present invention can identifiably display that information related to an application corresponds to a specific one of modes, thereby facilitating a user to check whether the information related to the application corresponds to the specific mode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 19A and 19B are diagrams for identifiably displaying a first information and a second information when running a schedule management application according to an embodiment of the present invention;

FIGS. 21A to 21C are diagrams for changing a first information to correspond to a second mode when running a schedule management application according to an embodiment of the present invention;

FIGS. 22A to 22C are diagrams for modifying information corresponding to a specific mode when running a schedule management application according to an embodiment of the present invention;

FIGS. 24A to 24C are diagrams for identifiably displaying a first information and a second information when running an email application according to an embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, mobile terminals described in this disclosure can include a mobile phone, a smart phone, a laptop computer, a digital broadcast terminal, a PDA (personal digital assistants), a PMP (portable multimedia player), a navigation system and the like.

Except when applicable to a mobile terminal only, it is apparent to those skilled in the art that the configurations according to an embodiment described in this disclosure is applicable to such a stationary terminal as a digital TV, a desktop computer and the like.

Figure 1:
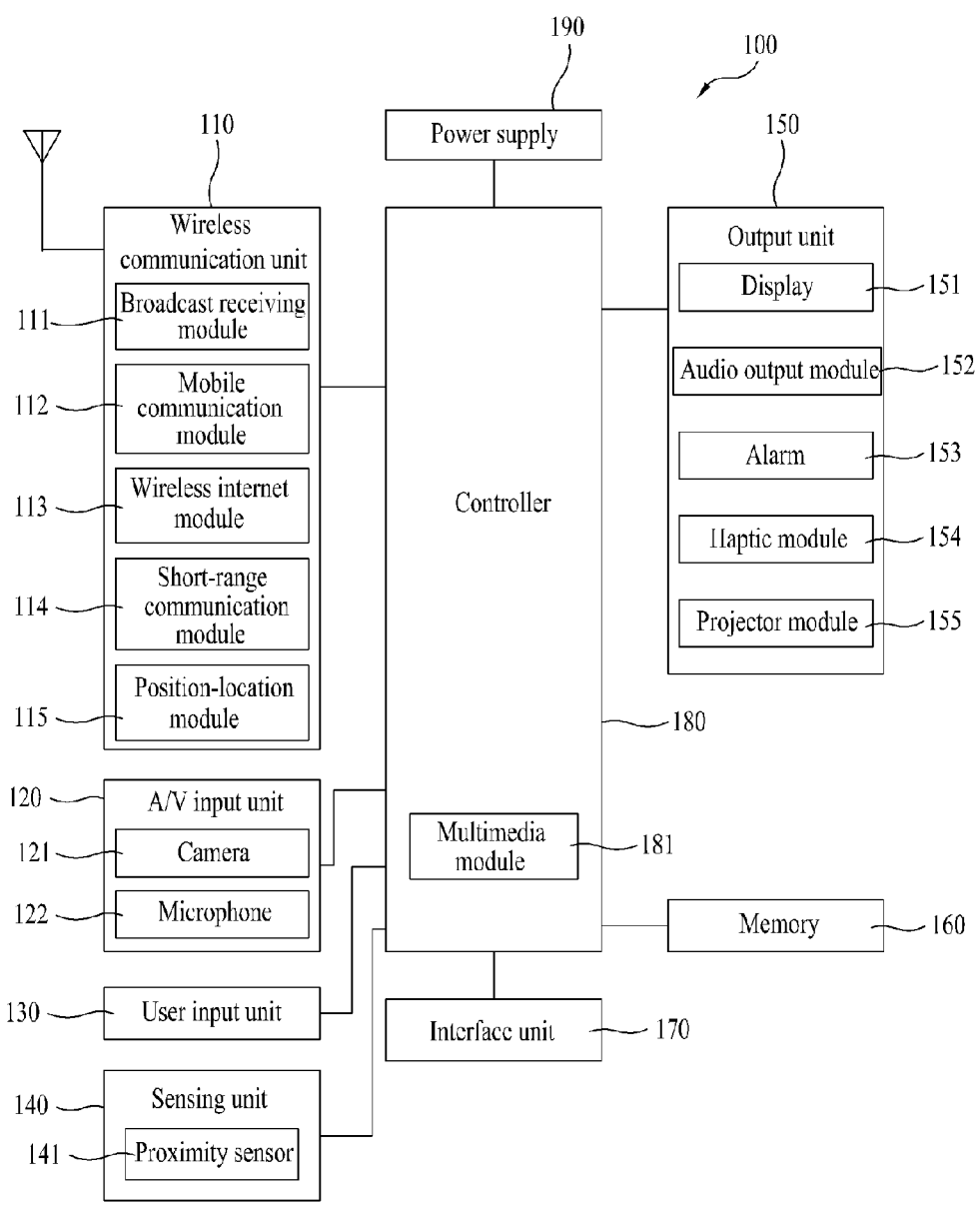
FIG. 1 is a block diagram of a mobile terminal according to one embodiment of the present invention.

FIG. 1 is a block diagram of a mobile terminal according to one embodiment of the present invention.

Referring to FIG. 1, a mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this instance, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. In a non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems. The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others. The wireless internet module 113 supports Internet access for the mobile terminal 100. This module may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 when a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user can see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units can be arranged on a single face of the mobile terminal 100 in a manner of being spaced apart from each other or being built in one body. Alternatively, a plurality of display units can be arranged on different faces of the mobile terminal 100.

When the display unit 151 and a sensor for detecting a touch action (hereinafter called 'touch sensor') configures a mutual layer structure (hereinafter called 'touchscreen'), it can use the display unit 151 as an input device as well as an output device. In this instance, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it can configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 can know whether a prescribed portion of the display unit 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, it is configured to detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named 'proximity touch'. In addition, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be output via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output in a manner of being synthesized together or can be output in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. In addition, the projector module 155 can display an image, which is identical to or partially different at least from the image displayed on the display unit 151, on an external screen or wall according to a control signal of the controller 180.

In particular, the projector module 155 can include a light source generating light (e.g., laser) for projecting an image externally, an image producing means for producing an image to output externally using the light generated from the light source, and a lens for enlarging to output the image externally in a predetermined focus distance. In addition, the projector module 155 can further include a device for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. In addition, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output when a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern recognizing process for recognizing a writing input and a picture drawing input carried out on the touchscreen as characters or images, respectively.

The power supply unit 190 provides power used by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
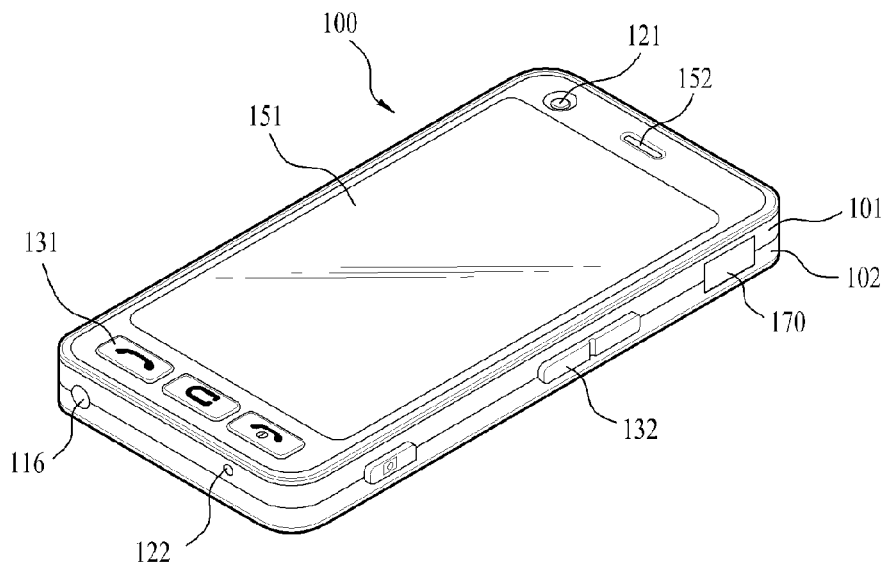
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example. The display unit 151, the audio output unit 152, the camera 121, user input units 130/131 and 132, the microphone 122, the interface 190 and the like can be provided to the terminal body, and more particularly, to the front case 101.

The display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display unit 151 or the like can be input to the second manipulating unit 132.

Figure 2B:
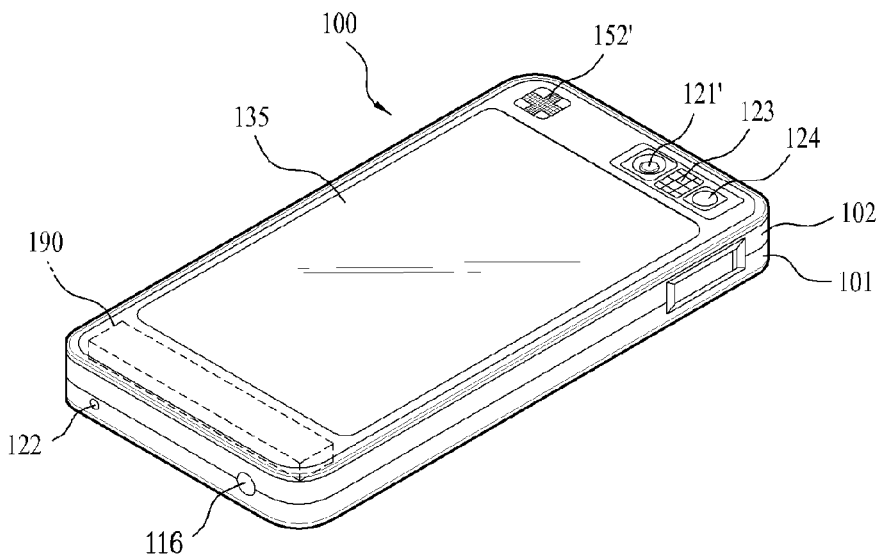
FIG. 2B is a rear perspective diagram of a mobile terminal according to one embodiment of the present invention.

FIG. 2B is a perspective diagram of a backside of the terminal shown in FIG. 2A. Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject when photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the former audio output unit 152 shown in FIG. 2A and may be used for implementation of a speakerphone mode in talking over the terminal. A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

The power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display unit 151. In this instance, if the display unit 151 is configured to output visual information from its both faces, it can recognize the visual information via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

First of all, a mobile terminal mentioned in the following description can include at least one of the components shown in FIG. 1. In addition, in order to perform an operation using the components (e.g., touchscreen, wireless communication unit, memory, etc.), the controller 180 can control an individual operation of each of the components or interconnected operations among a plurality of the components.

Applications mentioned in this disclosure are software programs drivable in a mobile terminal. If the application is driven, it can execute a corresponding function or operation. The application is basically stored in the mobile terminal (particularly, memory 160) or can be downloaded from an external server of an external terminal.

For example, the applications can include a compass, an augmented reality, a camera, a video player, a music player, a game, a news, a web browser, a message, a phonebook, a memo, a schedule management, and the like. Of course, the allocations are non-limited by this example and can be implemented in more various ways.

Contents or data associated with the applications can also exist. In this instance, the associated content or data is stored in the memory 160 or can be stored in an external server having a storage space.

For instance, the contents can include an audio file (associated with the music player), a video file (associated with the video player), a document file (associated with an e-book), and the like. In addition, the data can include a message content (associated with the message), a memo content (associated with the memo), a counterpart information (associated with the phonebook), a schedule content (associated with the schedule management), and the like.

According to an embodiment of the present invention, a mobile terminal can configure a plurality of modes differing from each other in application configuration for data security for one mode against another mode or data security between different modes. In addition, the mobile terminal according to an embodiment of the present invention can implement a plurality of the modes selectively or simultaneously (or sequentially).

When a specific application is executed in a prescribed mode, at least one application interoperable with the specific application can be executed in the prescribed mode. For instance, if a specific application is a voice call, an application interoperable with the voice call can include a phonebook, a message and the like.

Regarding mode discrimination in application configuration, an application executable in each of a plurality of modes can include at least one application (hereinafter named a dedicated application) executable by being dedicated to each of a plurality of the modes or at least one application (hereinafter named a common application) executable in any one of a plurality of the modes. In particular, the common application can change at least one feature in each of a plurality of the modes in which the corresponding application is executable. For instance, at least one of configuration, representation, security and the like of the common application is changeable. This shall be described in detail later.

Of course, the common application may not change its feature in each of a plurality of the modes in which the corresponding application is executable. For instance, if the common application includes such a basic terminal application as a voice call, a message and the like, it may not change its feature.

For example, if first to third applications are executed in a first mode and if the third application, a fourth application and a fifth application are executed in a second mode, the first and second applications, the third application and the fourth and fifth application can be called the dedicated applications of the first mode, the common application of the first and second modes and the dedicated applications of the second mode, respectively.

A plurality of modes can include a first mode (i.e., a private mode) facilitating user's personal life, a second mode (i.e., a business mode) facilitating a user's work life, and the like. This enables a mobile terminal to be discriminatively used in consideration of a user's personal life (e.g., privacy) and a user's public life (e.g., work life). In particular, in aspect of security reinforcement, when either a private mode or a business mode is implemented, restriction can be put on an access to information corresponding to the other mode.

The above-described private mode and the business mode are just the examples for describing a plurality of the modes. If the above-described private mode and the business mode are suitable for the mode discrimination reference mentioned in this disclosure, they are non-limited by their names. Although the mode discrimination of a plurality of the modes is explained in the above description based on the application configuration, it shall be described in detail with reference to the accompanying drawings later.

Implementation and activation of a plurality of modes mentioned in the description of the present invention shall be defined as follows.

First of all, according to an embodiment of the present invention, a mobile terminal can implement a plurality of modes all and is also able to activate one of a plurality of the currently implemented modes. For instance, if a plurality of the modes include a first mode and a second mode, the mobile terminal boots an operating system capable of implementing both of the first and second modes to implement and is then able to activate the implemented first or second mode selectively.

In particular, if both of the first and second modes are already implemented, the mode for displaying an executed screen on a current screen, the mode for designating the currently executed application, the mode having a high priority or the like can be called an activated mode. In this instance, a non-activated mode (or a deactivated mode) can be regarded as operating as a background despite being implemented in the mobile terminal. In more particular, if an executed screen of the first mode and an executed screen of the second mode are being displayed on a first region and a second region of the screen through screen partition, respectively, the mode selected by a user, the mode for activating the corresponding region currently, the mode for designating a currently executed application, the mode having a high priority or the like can be regarded as activated.

Occasionally, after the mobile terminal has implemented and activated one mode, if the mobile terminal attempts to switch the current mode to the other mode, the mobile terminal can implement and activate the other mode (i.e., selective implementation and activation of mode).

In the following description, implementation of a plurality of modes and operations of components used for inter-mode switching for a plurality of the modes are explained in detail with reference to FIGS. 3A to 4C.

Figure 3A:
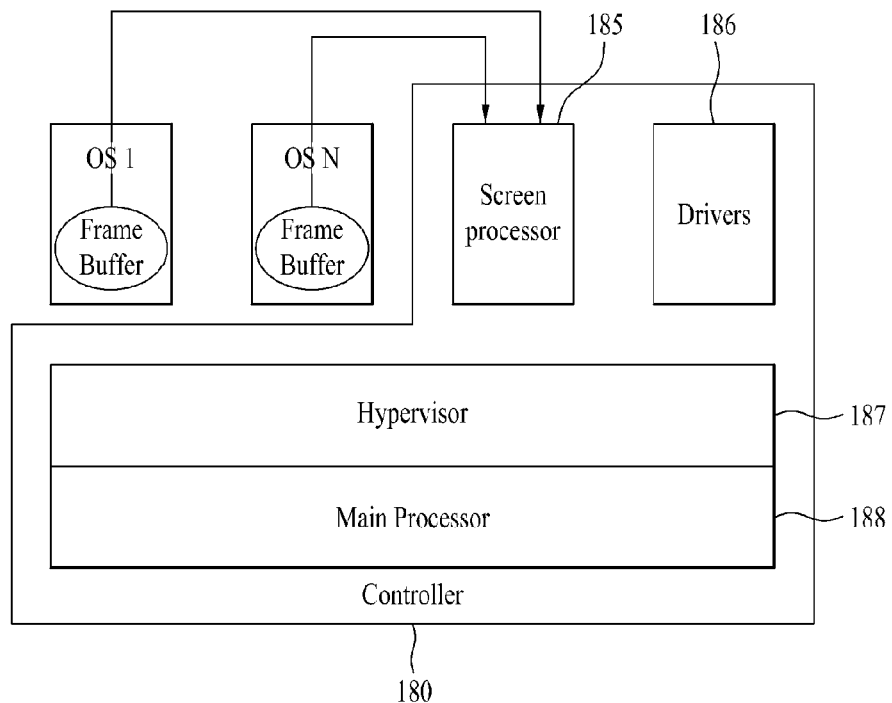
FIGS. 3A to 3C are block diagrams of components used for implementation of a plurality of modes and a mode switching among a plurality of the modes according to an embodiment of the present invention.
Figure 3B:
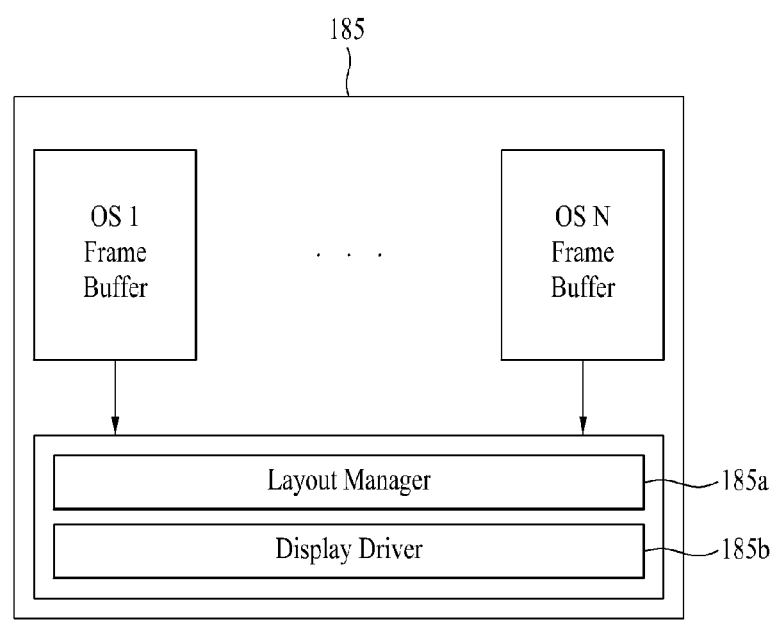
Figure 3C:
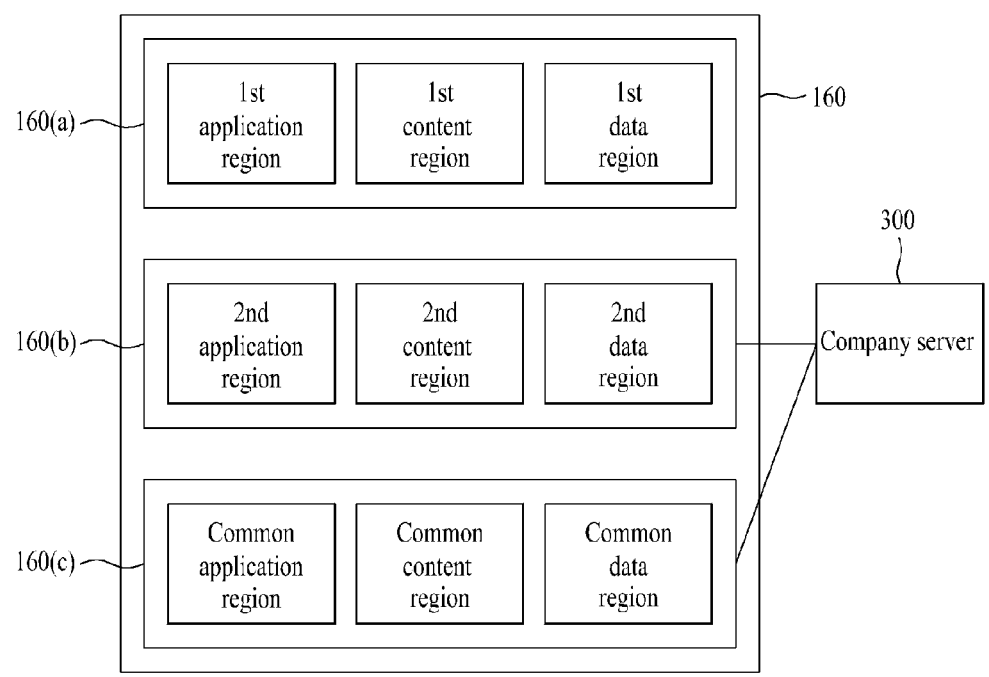

FIGS. 3A to 3C are block diagrams of components used for implementation of a plurality of modes and a mode switching among a plurality of the modes according to an embodiment of the present invention. FIG. 3A is a block diagram of a controller 180 for driving a plurality of operating systems (OSs) and configuring a dedicated screen of a plurality of operating systems. In addition, FIG. 3B is a block diagram of a screen processor 185 shown in FIG. 3A. In particular, FIGS. 3A and 3B show a circumstance in which a plurality of the operating systems are provided in parallel with each other (cf. FIG. 4A(a), FIG. 4B).

According to an embodiment of the present invention, a plurality of the modes can be implemented by a plurality of the operating systems, respectively. In particular, the operating system for supporting implementation can differ per mode.

Referring to FIG. 3A, a controller 180 can include a screen processor 185, a driver 186, a hypervisor 187 and a main processor 188. In this instance, the hypervisor 187 can be called such a terminology as a virtual engine (virtual machine), a virtualizing module (virtualization), a virtual engine monitor (virtual machine monitor), a virtualization module monitor (virtualization monitor) and the like. This terminology is just exemplary. In addition, a component capable of performing the same function of the hypervisor 187 is non-limited by the corresponding terminology.

A frame buffer is provided to each of a plurality of the operating systems stored in the memory 160. If a plurality of the operating systems are driven, the screen processor 185 receives a frame corresponding to a dedicated screen of the corresponding operating system from each of the frame buffers and then determines whether to display the dedicated screen of a prescribed one of the operating systems on a screen of the display unit 151 under the control of the main processor 188.

Under the control of the main processor 188, the screen processor 185 displays the dedicated screen of the specific operating system on the whole screen of the display unit 151 (e.g., when implementing one mode only). Alternatively, the screen processor 185 generates one integrated frame by combining and/or editing the frames received from the frame buffers and is then able to display an integrated dedicated screen including all the dedicated screens of a plurality of the operating systems (e.g., when implementing a plurality of the modes).

Referring to FIG. 3A, a plurality of the operating systems OS1, . . . OS N are prepared in parallel with each other, which can be described in detail with reference to FIGS. 4A(a) and 4B as follows.

Figure 4A:
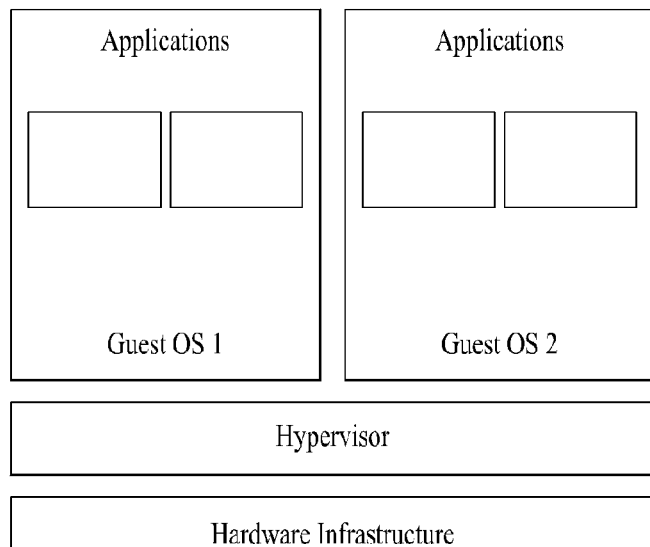
FIGS. 4A to 4C are block diagrams of components used for operating a plurality of operating system for implementing a plurality of modes according to an embodiment of the present invention.
Figure 4A:
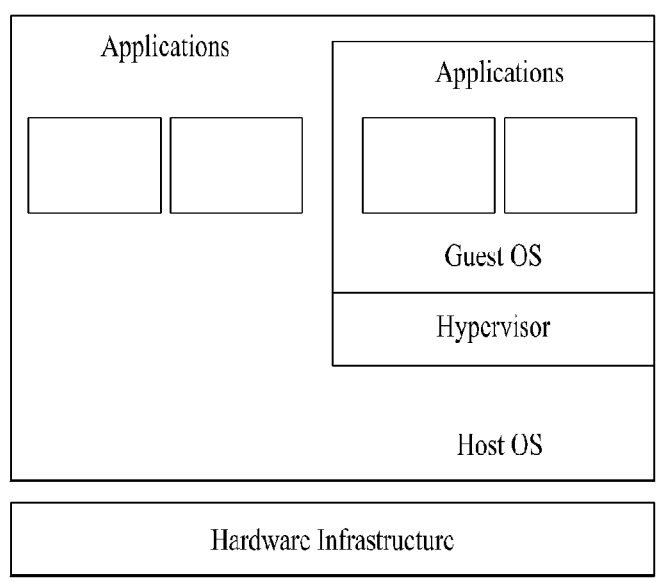
Figure 4B:
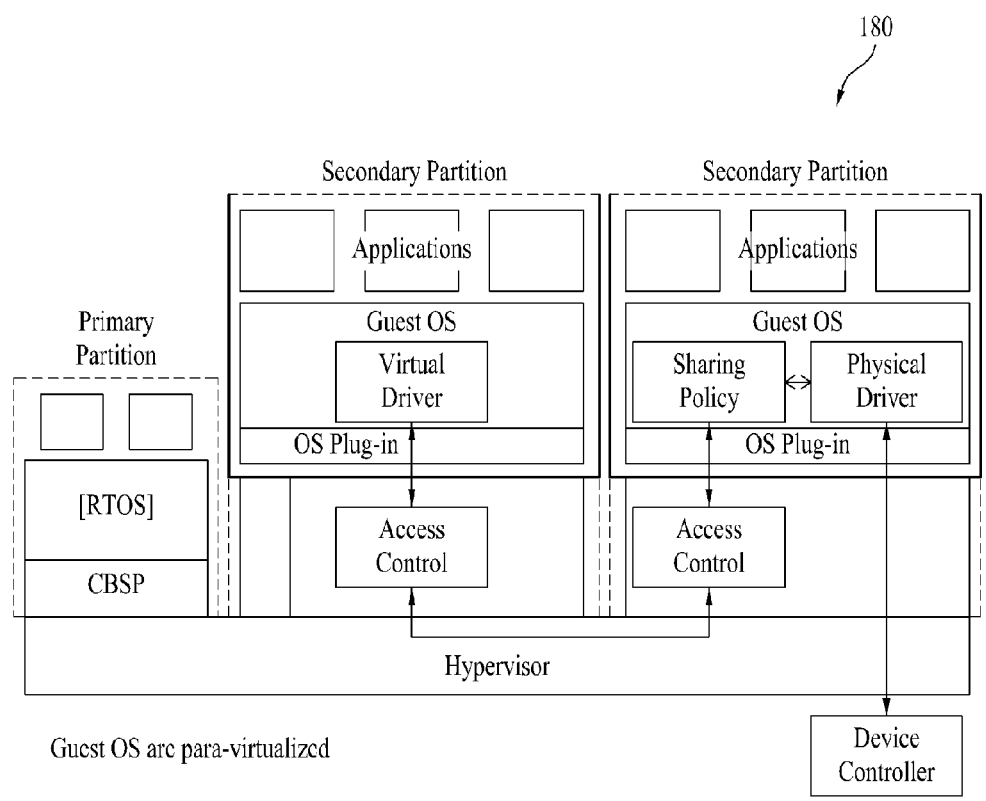

FIGS. 4A(a) and 4B show a scheme of booting a plurality of operating systems Guest OS 1 and Guest OS 2 respectively supporting different modes in parallel by loading a hypervisor (hereinafter named a first scheme).

Referring to FIGS. 4A(a) and 4B, the mobile terminal 100 can implement Guest OS 1 and Guest OS 2 selectively, sequentially or simultaneously. In addition, a different mode can be designated to each of the Guest OS 1 and the Guest OS 2. In this instance, the operation of the Guest OS 1 and the Guest OS 2 and the corresponding mode activation can be performed by the hypervisor. The components shown in FIG. 4B can perform general operations related to the virtualization engine technology.

Multi-OS booting and mode activation corresponding to the multi-OS booting are described in detail as follows. First of all, in circumstance (1) of activating a mode corresponding to the currently booted Guest OS 1 or Guest Os 2 or in circumstance (2) of booting the Guest OS 1 corresponding to first mode and the Guest OS 2 corresponding to a second mode sequentially or simultaneously, the controller 180 (particularly, the hypervisor) implements and activates either the first mode or the second mode (2-1) or can activate either the first or second mode despite implementing both of the first and second modes (2-2).

Referring now to FIG. 3, the screen processor 185, includes a layout manager 185a and a display driver 185b (FIG. 3B).

Under the control of the main processor 188, the layout manager 185a generates one integrated frame by combing or editing the frames received from the frame buffers and the display driver 185b then controls the frame generated by the layout manager 185a to be displayed on the display unit 151.

The driver 186 controls the entire operating systems to be driven. The hypervisor 187 is a middleware between the main processor 188 and each of the operating systems and includes a virtualization engine configured to a plurality of the operating systems to be usable in the mobile terminal 100 according to an embodiment of the present invention. In addition, the main processor 188 controls all operations related to the driving of a plurality of the operating systems according to an embodiment of the present invention.

As mentioned in the above description, the screen processor 185, the driver 186, the hypervisor 187 and the main processor 188 can be included in the controller 180 or can be stored as software in the memory 160.

FIG. 3C is a block diagram of the memory 160 having a database storage region corresponding to each of a plurality of the modes. According to an embodiment of the present invention, the mobile terminal can manage the database storage regions of a plurality of the modes discriminatively. In particular, when a plurality of the modes are implemented by the different operating systems, respectively, the mobile terminal can manage the database storage regions of a plurality of the modes discriminatively.

Generally, when at least one operating system capable of implementing a first mode and a second mode is provided, the memory 160 can store an application corresponding to each of the at least one operating system. Therefore, the provided at least one or more operating systems can be booted selectively or simultaneously under the control of the controller 180.

For instance, the operating system can include such a commercial OS as Android OS, Linux based OS, Windows Mobile OS, Apple OS and the like. In addition, a dedicated application can be differently set for each of the operating systems. In addition, a multi-OS can include different kinds of operating systems (e.g., Android OS, Apple OS, etc.) and the same kinds of operating systems (e.g., 2.1 version of Android OS, 2.2 version of Android OS, etc.) differing from each other in version.

According to an embodiment of the present invention, assuming that both of the first mode and the second mode can be implemented, the memory 160 can include a first database storage region 160(a) corresponding to the first mode, a second database storage region 160(b) corresponding to the second mode, and a common database storage region 160(c) in common with the first mode and the second mode. Occasionally, the common database storage region 160(c) can be omitted. In this instance, a commonly-designated application and content or data associated with the corresponding application can be stored in the database storage region of the corresponding mode.

In particular, in configuring the first, second and common database storage regions, the mobile terminal 100 uses memories different from each other in hardware as the storage regions, puts restriction on accessing the storage regions per mode despite providing the storage regions within a same memory, or can discriminate the storage regions from each other using a storage partition per mode.

In this instance, the same operating system implements the first mode and the second mode or different operating systems can implement the first mode and the second mode, respectively. Moreover, at least two or modes can be implemented by the mobile terminal 100. If so, the database storage regions can be further subdivided.

In particular, the first database storage region 160(a) can include a region (i.e., a first application region) for storing at least one first application executable in the first mode, a region (i.e., a first content region) for storing a content associated with the first application and a region (i.e., a first data region) for storing data associated with the first application.

In addition, the second database storage region 160(b) can include a region (i.e., a second application region) for storing at least one second application executable in the second mode, a region (i.e., a second content region) for storing a content associated with the second application and a region (i.e., a second data region) for storing data associated with the second application.

Moreover, the common database storage region 160(c) can include a region (i.e., a common application region) for storing at least one common application executable in both of the first mode and the second mode, a region (i.e., a common content region) for storing a content associated with the common application and a region (i.e., a common data region) for storing data associated with the common application.

When the second mode is a business mode that facilitates a user's public life, information stored in the second database storage region 160(b) and information corresponding to the second mode in the common database storage region 160(c) can be utilized only if the corresponding information is stored in a manner of being shared with a company server 300, the corresponding information is stored in the company server 300 (i.e., the second database storage region 160(b) is not needed) or the company server 300 is accessed. In this instance, the company server 300 can include a server of a company, for which a user works, a server of a specific company designated by a user (or a company where the user works), or the like.

While the first mode is activated, the mobile terminal 100 can utilize the information stored in the first database storage region 160(a) and the information corresponding to the first mode in the common database storage region 160(c). While the second mode is activated, the mobile terminal 100 can utilize all the information stored in the first, second and common database storage regions 160(a), 160(b) and 160(c).

Alternatively, while the second mode is activated, the mobile terminal 100 can utilize the information stored in the first database storage region 160(a) and the information corresponding to the second mode in the common database storage region 160(c). While the first mode is activated, the mobile terminal 100 can utilize all the information stored in the first, second and common database storage regions 160(a), 160(b) and 160(c).

Optionally, it can control the mobile terminal 100 not to utilize the information on the first mode in the course of the activated second mode. Besides, although the drawing shows that the application region, the content region and the data region are situated in the database storage region, the application region, the content region and the data region can be integrated together if desired.

FIGS. 4A(b) and 4C show a scheme of driving a hypervisor on a Host OS for supporting one mode to boot a Guest OS for supporting another mode (hereinafter named a second scheme). In particular, a mode supported by the Host OS can include a private mode. In addition, a mode supported by the Guest OS can include a business mode.

Figure 4C:
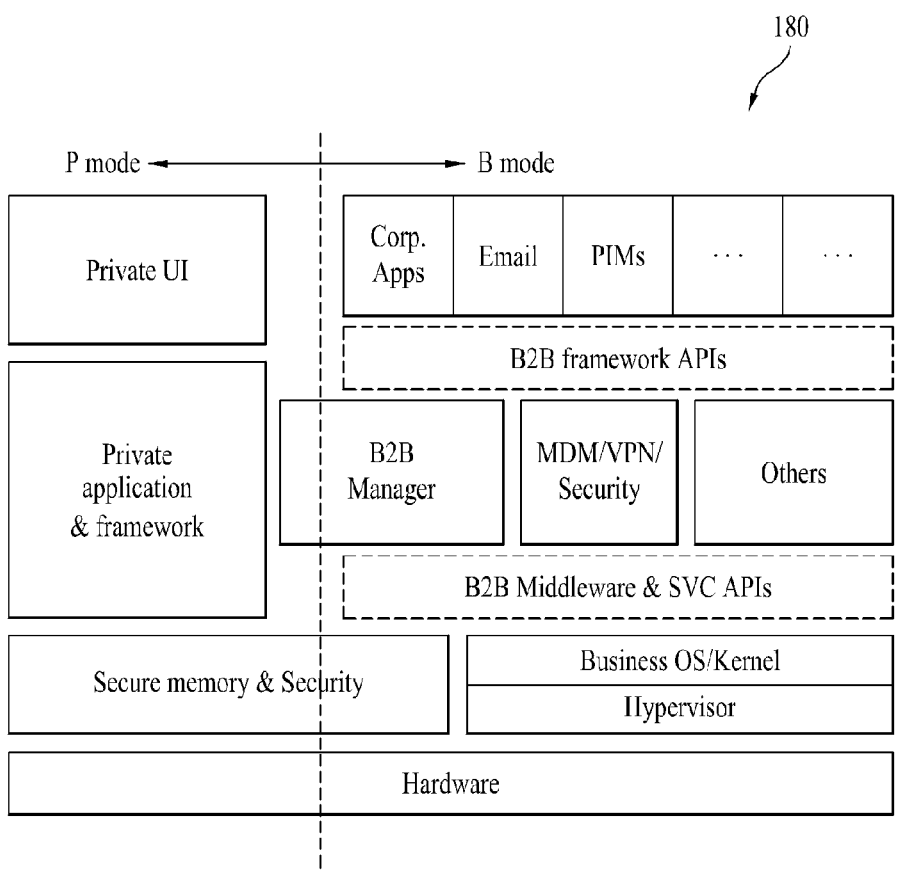

In more particular, referring to FIG. 4C, a B2B manager can perform a switching operation between a private mode (hereinafter abbreviated a P mode) and a business mode (hereinafter abbreviated a B mode). Components shown in a P mode region of the two regions partitioned by a dotted line can operate when the private mode implementation, components shown in the B mode region can operate when the business mode implementation, and components included in both of the modes can operate in both of the modes.

According to an embodiment of the present invention, the mobile terminal 100 can implement a plurality of modes on an operating system selectively, simultaneously or sequentially. A different operating system (hereinafter named an individual operating system) is designated to each of a plurality of the modes or a common operating system can be designated to a plurality of the modes. Specifically, implementation of a plurality of the modes can be controlled by the hypervisor 187.

In particular, a currently implemented or activated mode in accordance with an individual or common operating system is defined as follows. For clarity and convenience of the following description, assume that a plurality of modes include a first mode and a second mode. Of course, at least two or more modes can exist if desired.

First of all, when a common operating system is booted, the controller 180 implements and activates either the first mode or the second mode (1) or can activate either the first mode or the second mode despite implementing both of the first and second modes.

When an individual operating system is booted, the controller implements and activates a mode corresponding to a currently booted individual operating system (1), implements and activates a mode corresponding to one of the first mode and the second mode when booting a first operating system corresponding to the first mode and a second operating system corresponding to the second mode sequentially or simultaneously (2-1), or activates either the first mode or the second mode despite implementing both of the first mode and the second mode (2-2).

In the following description, how to discriminate a plurality of modes from each other is explained in detail. First of all, according to an embodiment of the present invention, each of a plurality of modes can be discriminated by at least one of a mode indicator, a database storage region, an operating system, a user access authority, an application configuration, a content configuration, a data configuration, an application feature, an application group, a group identifier and the like.

When discriminating a plurality of modes using a mode indictor according to a first embodiment is explained as follows. First of all, each of a plurality of modes can have an indicator different to indicate a corresponding mode. An indicator per mode is basically stored in the mobile terminal 100 or can be downloaded from an external server or an external terminal. The indicator per mode is set or selected by a user or can be randomly set by the controller 180.

For instance, each of a plurality of the modes can have a different one of a mode icon, a mode image, a background image, a background color/brightness, a letter font/color/size, a home screen picture (number of pages and page indicator included), an application arrangement structure (e.g., the number of applications included in one home screen, etc.), an application identifier, an LED color, an alarm sound such as a bell sound and the like, a keypad type (backlight color of keypad included), a mode switching key zone, a group identifier (described later) and the like. Of course, those examples of the mode indicator are just exemplary and can include all display elements for discriminating a mode.

This is explained in detail with reference to FIGS. 5A to 5D. For clarity and convenience of the following description, assume that a first mode and a second mode include a private mode and a business mode, respectively. In addition, assume that either the private mode or the business mode is in an active state.

FIGS. 5A to 10C are diagrams for discriminating a plurality of modes according to an embodiment of the present invention. Retelling to FIG. 5A, if a personal mode is currently activated, the mobile terminal 100 can display an icon (P mode) 501 corresponding to the private mode on a prescribed region of a screen (FIG. 5A(*a*)). If a business mode is currently activated, the mobile terminal 100 can display an icon (B mode) 502 corresponding to the business mode on a prescribed region of a screen (FIG. 5A(*b*)).

Figure 5A:
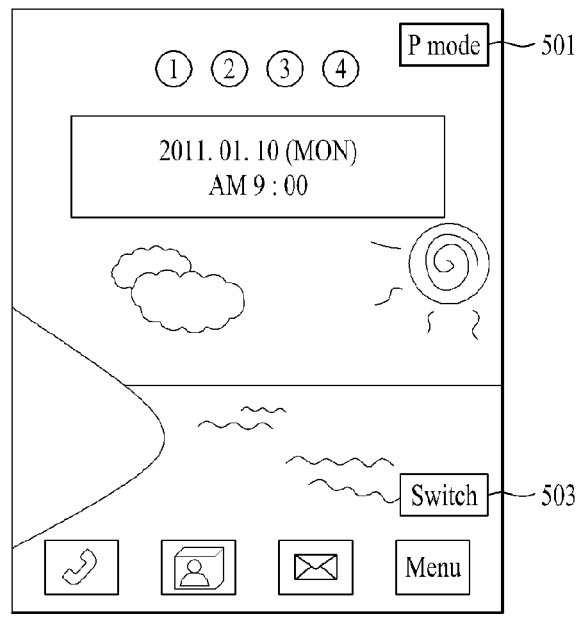
FIGS. 5A to 10C are diagrams for discriminating a plurality of modes according to an embodiment of the present invention.
Figure 5A:
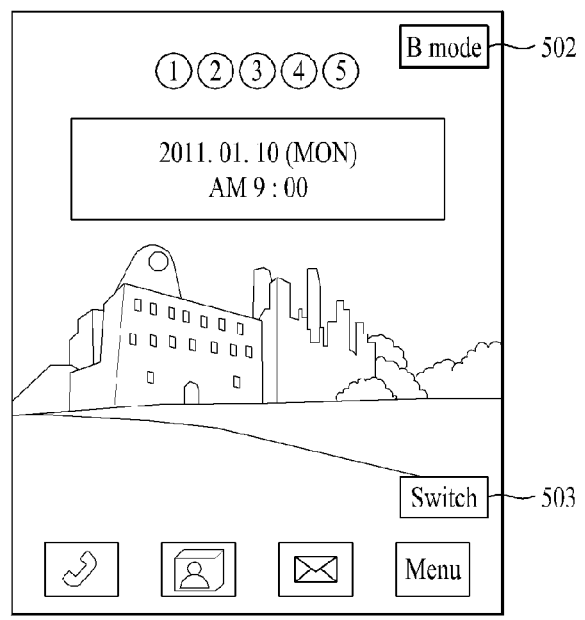
Figure 5B:
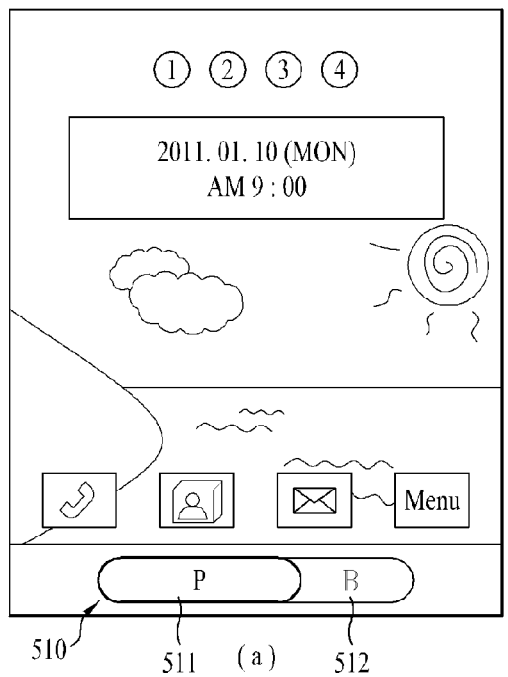
Figure 5B:
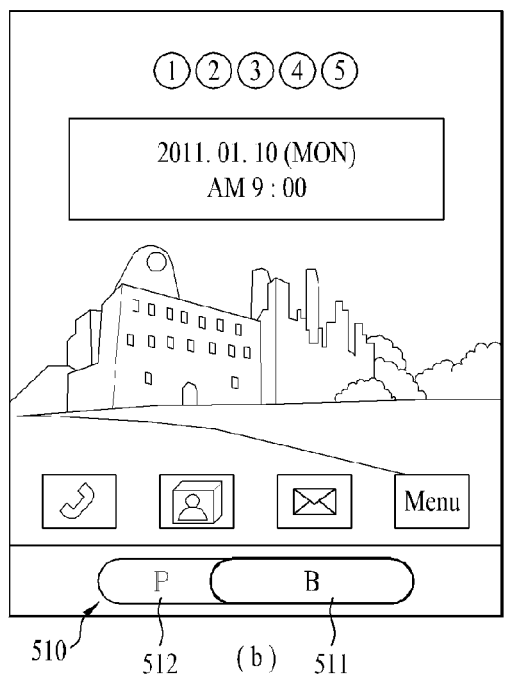

Referring to FIG. 5B, the mobile terminal 100 includes a mode switching key region 510 provided to a prescribed region of the screen. If the private mode is currently activated, the mobile terminal 100 can discriminatively display a zone (P) 511 corresponding to the private mode in the mode switching key region 510 (FIG. 5B(*a*)). If the business mode is currently activated, the mobile terminal 100 can discriminatively display a zone (B) 512 corresponding to the business mode in the mode switching key region 510 (FIG. 5B(*b*)).

Figure 5C:
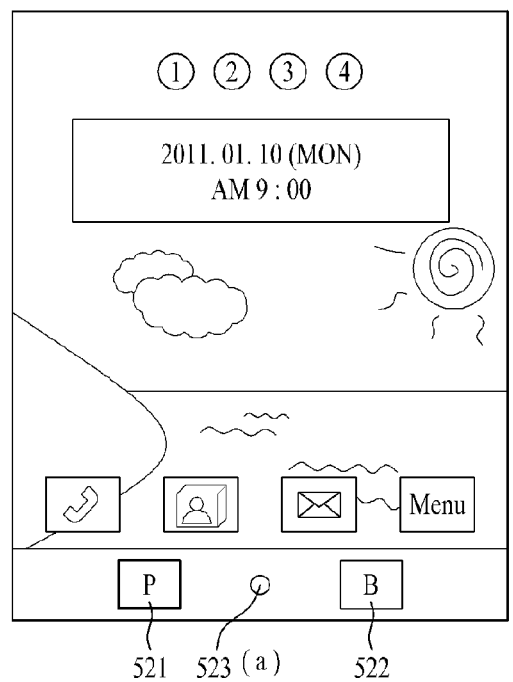
Figure 5C:
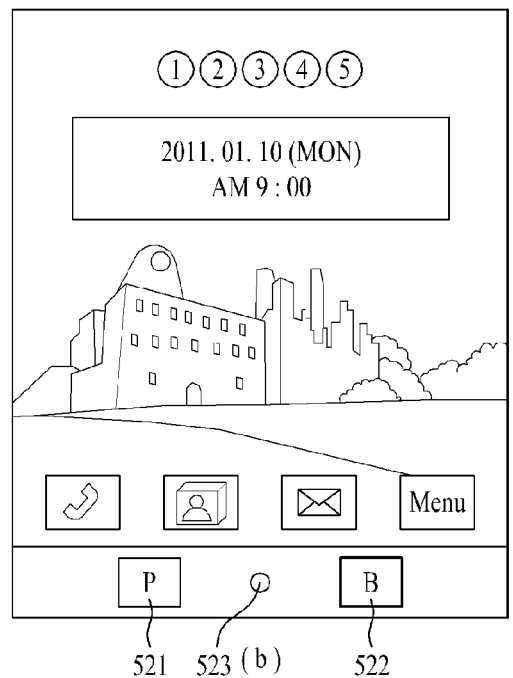

Referring to FIG. 5C, a private mode zone 521, a business mode zone 522 and a switching command zone 523 are provided to the screen of the mobile terminal 100. If the private mode is currently activated, the mobile terminal 100 can discriminatively display the private mode zone (P) 521 (FIG. 5C(*a*)). If the business mode is currently activated, the mobile terminal 100 can discriminatively display the business mode zone (B) 522 (FIG. 5C(*b*)).

Figure 5D:
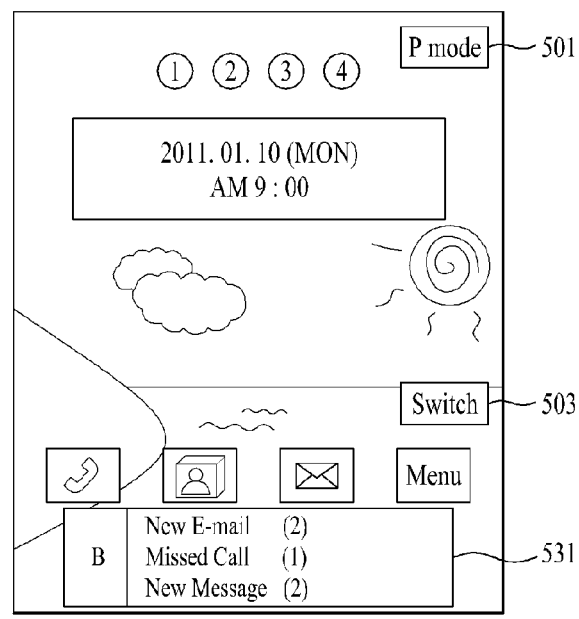
Figure 5D:
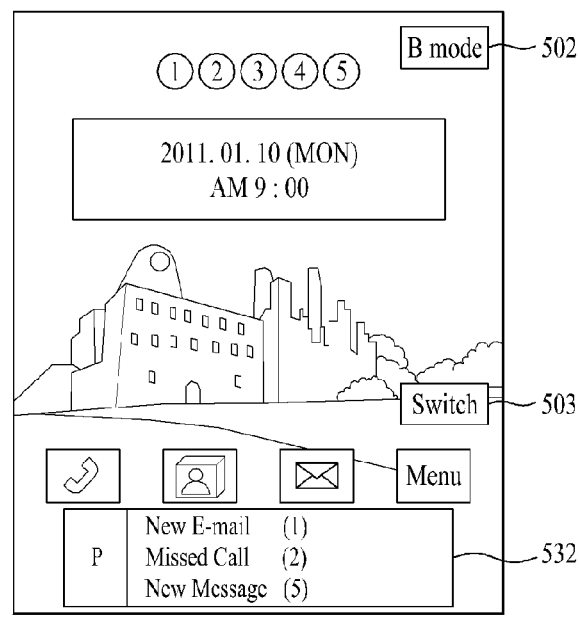

Referring to FIG. 5D, if the private mode is currently activated, the mobile terminal 100 can display an announcement window 531 for announcing events (e.g., email, message, call, etc.) occurring in association with the business mode or the number of the events (or, occurrence time, counterpart information, etc.) on a prescribed region of the screen (FIG. 5D(*a*)). If the business mode is currently activated, the mobile terminal 100 can display an announcement window 532 for announcing events (e.g., email, message, call, etc.) occurring in association with the private mode or the number of the events (or, occurrence time, counterpart information, etc.) on a prescribed region of the screen (FIG. 5D(*b*)).

In the following description, when discriminating a plurality of modes using a database storage region according to a second embodiment is explained. First of all, a plurality of the modes can discriminatively have database storage regions within the memory 160, respectively (cf. FIG. 3C).

Each of a plurality of the modes can utilize the information stored in the corresponding database storage region or the corresponding information stored in the common database storage region only. Moreover, it can set the information on one mode not to be utilized in other modes. Besides, one (e.g., business mode) of a plurality of the modes can utilize information on another mode (e.g., private mode), whereas the latter mode can be set not to use the information on the former mode.

If the information on the first mode can be utilized in the second mode (yet, the first mode is unable to utilize the information on the second mode), it can be said that an access restriction is put on the second mode or that a higher security level is set on the second mode (described later).

This is explained in detail with reference to FIGS. A to 7B as follows. For clarity and convenience of the following description, assume that a first mode and a second mode include a private mode and a business mode, respectively. Assume that either the private mode or the business mode is in an active state. In addition, assume that a common application of the first and second modes is currently executed.

Figure 6A:
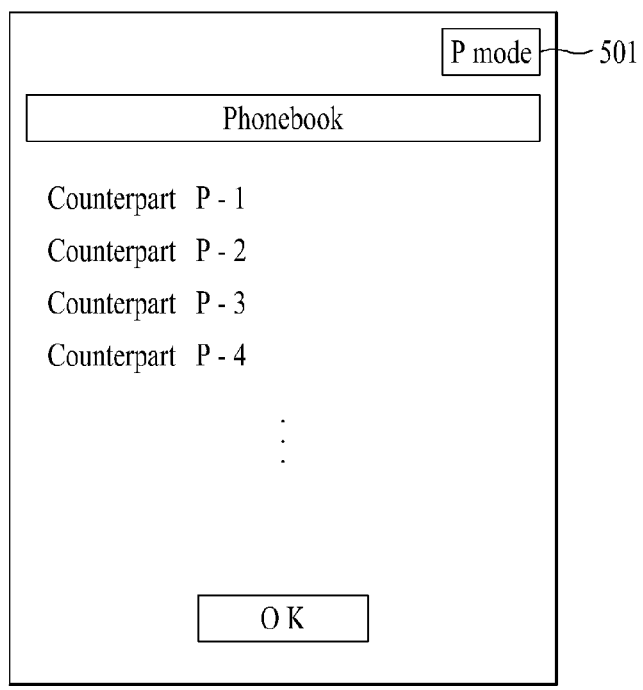

Referring to FIG. 6A, when a phonebook (example of a common application) is being executed in the private mode, the mobile terminal 100 extracts counterpart information corresponding to the private mode from counterpart information associated with the phonebook only and is then able to display the extracted counterpart information.

Figure 6B:
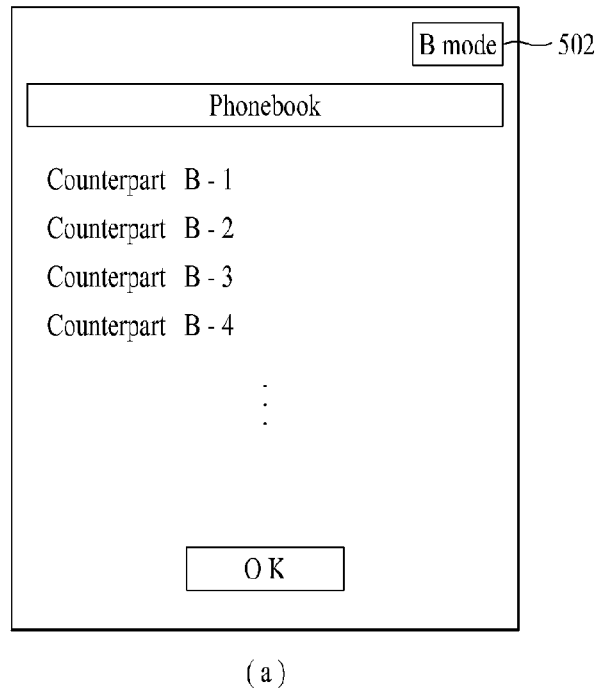
Figure 6B:
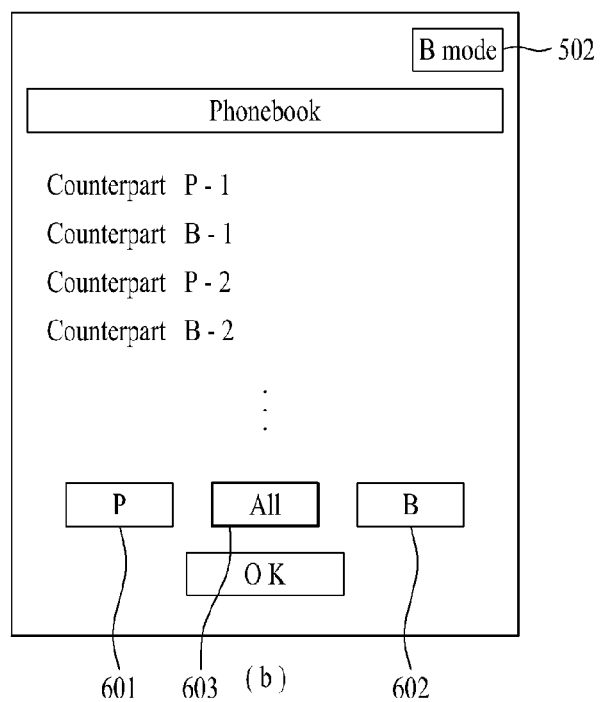

Referring to FIG. 6B, when executing a phonebook in the private mode, the mobile terminal 100 extracts counterpart information corresponding to the business mode from counterpart information associated with the phonebook and then displays the extracted counterpart information (FIG. 6B(a)). Alternatively, the mobile terminal 100 extracts counterpart information corresponding to either the private mode or the business mode and is then able to display the extracted counterpart information (FIG. 6B(b)).

In particular, FIG. 6B(b) shows a situation in which a zone (All) 603 is activated. If a privacy zone (P) 601 is activated, the mobile terminal 100 can selectively display the counterpart information corresponding to the private mode only. If a business zone (B) 602 is activated, the mobile terminal 100 can selectively display the counterpart information corresponding to the business mode only.

Figure 7A:
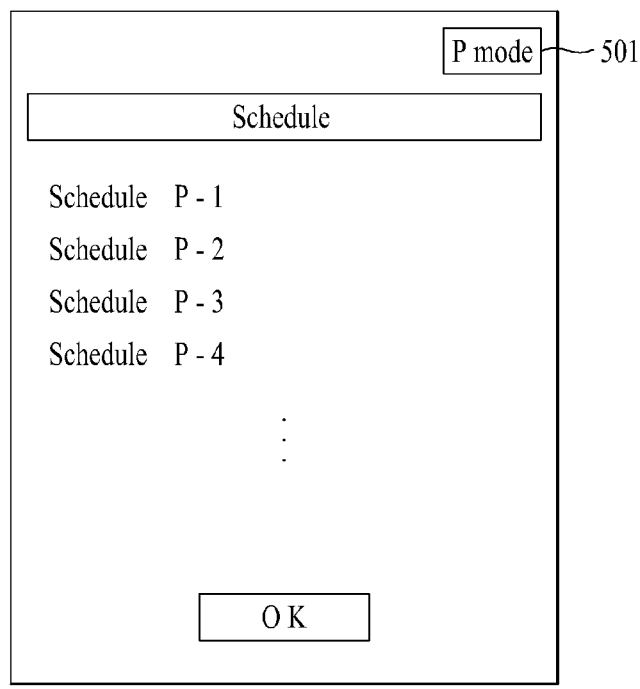

Referring to FIG. 7A, when a schedule management (example of a common application) is being executed in the private mode, the mobile terminal 100 extracts schedules corresponding to the private mode from schedules associated with the schedule management only and is then able to display the extracted schedules.

Figure 7B:
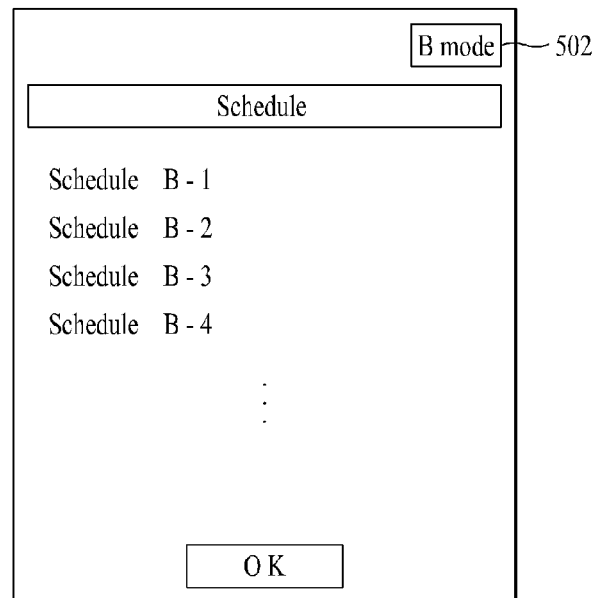
Figure 7B:
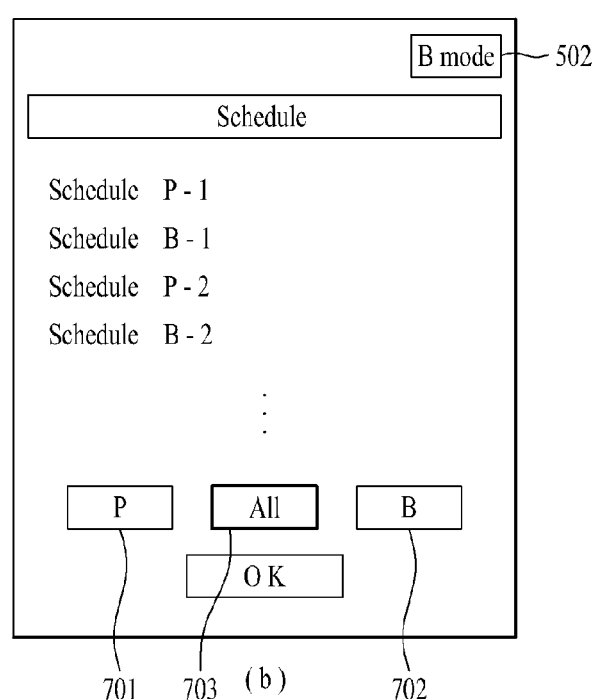

Referring to FIG. 7B, when executing a schedule management in the private mode, the mobile terminal 100 extracts schedules corresponding to the business mode from schedules associated with the schedule management and then displays the extracted schedules (FIG. 7B(a)). Alternatively, the mobile terminal 100 extracts schedules corresponding to either the private mode or the business mode and is then able to display the extracted schedules (FIG. 7B(b)).

In particular, FIG. 7B(b) shows a situation in which a zone (All) 703 is activated. If a privacy zone (P) 701 is activated, the mobile terminal 100 can selectively display the schedules corresponding to the private mode only. If a business zone (B) 702 is activated, the mobile terminal 100 can selectively display the schedules corresponding to the business mode only.

Specifically, referring to FIGS. 6A to 7B, although the private mode is unable to access the information on the business mode or the database storage region storing the information on the business mode, the business mode can freely access the information on the private mode or the database storage region storing the information on the private mode.

According to a third embodiment, each of a plurality of modes can be discriminated by a corresponding user access authority. For clarity and convenience of the following description, assume that a plurality of the modes include a first mode and a second mode.

Regarding each of a plurality of the modes, as a different security level is set, a user access authority can be changed (1). Regarding each of a plurality of the modes, if an access restriction is put on one mode but an access restriction is not put on the other mode, a user access authority can be changed (2). For this, in order to enter a specific one of a plurality of the modes, an authentication procedure can be requested. Hence, the specific mode can be entered only if a valid authentication procedure is performed to enter the specific mode. In particular, if an access restriction or a security level over a predetermined reference is put on the specific mode, an authentication procedure can be requested.

For instance, in a mode having a high user access authority, information corresponding to a mode having a low user access authority or a database storage region of the corresponding information is freely accessed and can be freely utilized. On the contrary, in a mode having a low user access authority, it is unable to access information corresponding to a mode having a high user access authority or a database storage region of the corresponding information.

When entering or switching to a mode having a high user access authority, an input of a user authentication information is requested. If a valid user authentication information is input, the mobile terminal 100 can enter or switch to the mode having the high user access authority (example of an authentication procedure). When a mode having a low security level, the mobile terminal 100 is requested to input a user authentication information (e.g., name, social security number, etc.) of a low level. When a mode having a high security level, the mobile terminal 100 is requested to input a user authentication information (e.g., name, social security number, specific touch pattern, specific password, etc.) of a high level.

Regarding management (e.g., input, inquiry, editing, etc.) of information (e.g., content, data, etc.) on an application in accordance with a user access authority, three kinds of circumstances are described in detail as follows. For clarity and convenience of the following description, assume that a plurality of modes include a first mode and a second mode.

First of all, according to a first circumstance, applications to which contents or data can be input regardless of a mode are possible. For instance, the content or data inputtable application can include such an application for performing a basic function in using a terminal as a schedule management, a scheduler, an email, a message, a messenger, a conference call, a video call, an internet, a phonebook and the like.

According to a second circumstance, similar to the first circumstance, information input is possible without mode discrimination. Yet, it can discriminate a database storage region per mode (cf. FIG. 3C). In particular, inter-mode information exchange is impossible but unilateral information exchange is possible. For instance, information transfer from a private mode to a business mode is possible but information transfer from a business mode to a private mode is impossible. In another instance, by setting a plurality of modes to different security levels, respectively, information transfer from a low level to a high level is possible but information transfer from a high level to a low level is impossible.

In a specific situation, an external terminal having a predetermined authority in a remote place deletes information (e.g., application, content, data, etc.) on a specific mode only or can shut down the specific mode itself. For instance, the specific situation can include one of an employee taking out a terminal without authorization, a terminal being stolen, an unregistered storage medium being loaded in a terminal, a terminal accessing an unsubscribed network, and the like.

Furthermore, regarding a user access authority, it can differentiate an authority for accessing an application, a content, a data or the like, which is available for a business mode, in accordance with a user level (e.g., the user level is determined in consideration of rank in company, duty attribute in company, department in company, etc.) of the mobile terminal 100. In addition, it is also able to differentiate a function for a specific application. For instance, when a user level (e.g., a group head) is equal to or higher than a predetermined reference, an approval grant function is usable. Yet, when a user level (e.g., a company employee) is lower than a predetermined reference, an approval grant function is deactivated. Moreover, the same application can have a usable content/ data that differs in accordance with a user level or the same content/data can have a different range of the provided information in accordance with a user level (e.g., a different data field can be configured in accordance with a user level). Besides, in accordance with a user's authority, an icon associated with a job failing to belong to the corresponding authority is not displayed on a terminal itself. Even if the icon is displayed on the terminal, it can be set not to be executed.

According to a third circumstance, applications (e.g., dedicated applications) accessible to corresponding information as well as operable in either a first mode or a second mode are also possible.

For instance, for security matters in a business mode, a photographing function is restricted, a conditional access to a network is granted, or a print function is blocked. When the business mode, a business related application is provided. When a private mode, the business related application may not be provided. Of course, when the private mode, a privacy related application is provided. When the business mode, the privacy related application may not be provided.

Meanwhile, a content or application specialized in a unilateral mode only is also possible. For instance, the application specialized for the business mode can include a company business related application. In addition, the company business related application can perform a function of an upload to a company server, a function of a download to the company server and the like.

In addition, it can put an access restriction (or entry) per mode in accordance with a place or time. For instance, it can set a business mode not to be entered at home. In another instance, it can set a private mode not to be entered on a specific time zone. Occasionally, a separately authorized person can enter the business mode at home or the private mode at office on a specific time zone.

Moreover, since an interface is provided to be shared with users in the business mode, information can be shared with the users. If the business mode is switched to the private mode, the interface provided for the information sharing can be shut down.

Furthermore, it is possible to use one hardware module (e.g., a common module) for a plurality of modes in common or use another hardware module (e.g., a dedicated module) for a specific one of a plurality of the modes. Hence, if a first mode is currently activated, a common module and a dedicated mode of the first mode are activated, while a dedicated module of a second module is not activated. In this instance, the common module and the dedicated module are designated in accordance with a user selection or can be designated by a decision made by the controller 180 or the company server 300.

For instance, assuming that a first mode and a second mode are a private mode and a business mode, respectively, a common module can include one of a mobile communication module 112 for call and message transmission and reception, a power supply unit 190, a display unit 151, a memory 160 and the like. A dedicated module of the private mode can include one of a camera 121, a position location module 115 and the like. In addition, a dedicated module of the business mode can include a projector module 155 or the like. The above examples of the communication module and the dedicated module are just exemplary, by which the communication module and the dedicated module are non-limited. In addition, the communication module and the dedicated module can be configured in more various ways.

In the following description, a user access authority is explained in detail with reference to FIGS. 8A and 8B. For clarity and convenience of the following description, assume a circumstance in which the same content is accessed.

Figure 8A:
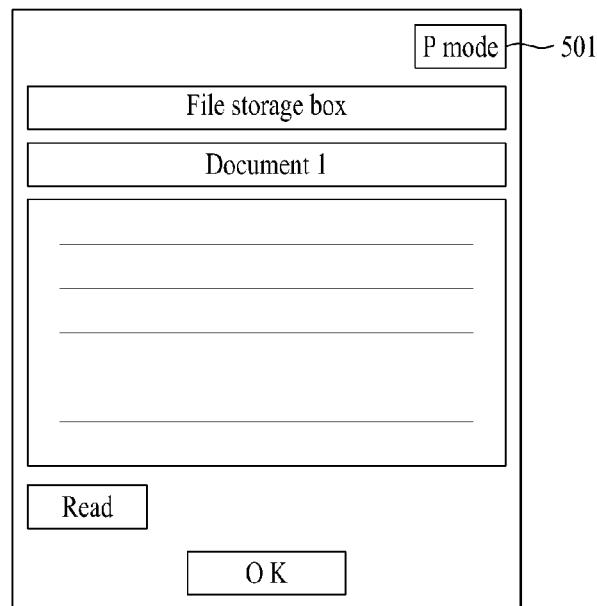
Figure 8A:
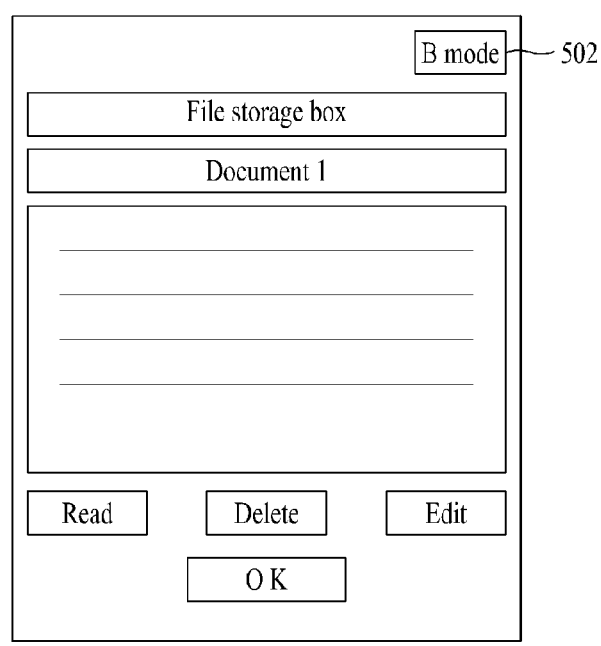

Referring to FIG. 8A, when a document 1 (example of content) is accessed in a private mode, the mobile terminal 100 can grant 'read authority' for the document 1 (FIG. 8A(*a*)). When a document 1 is accessed in a business, the mobile terminal 100 can grant 'read authority, delete authority, edit authority' for the document 1 (FIG. 8A(*b*)). Moreover, if a user is authorized over a predetermined level in a company, an approval authority can be granted to the user for the document 1 that requires approval or authorization.

Figure 8B:
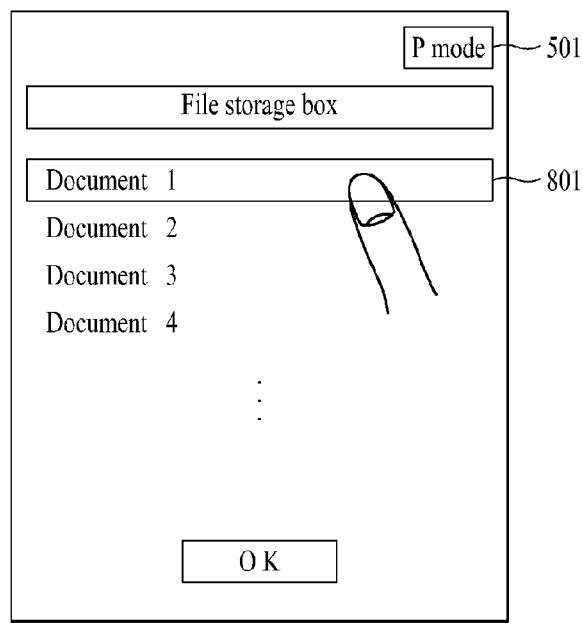
Figure 8B:
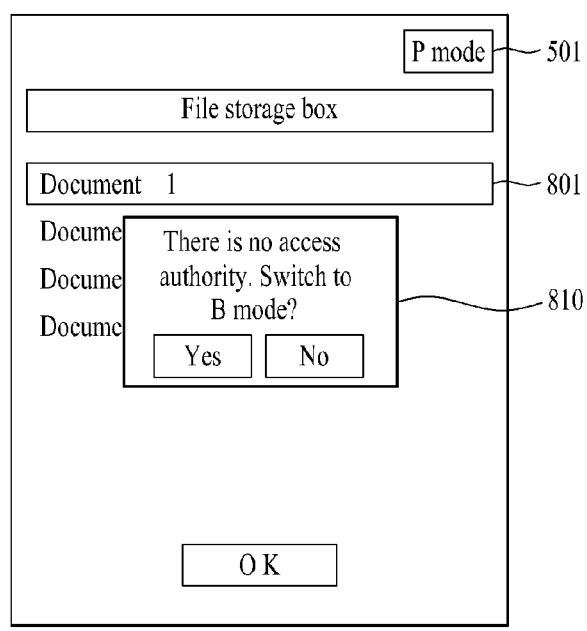

Referring to FIG. 8B, when a file 1 (example of content) corresponding to a business mode is selected from a file list in a private mode (FIG. 8B(*a*)), the mobile terminal 100 informs a user that there is no access authority on the file 1 and enables the user to select whether to switch the private mode to the business mode to check the file 1 (FIG. 8B(*b*)).

Of course, when the private mode in FIG. 8B, a file corresponding to the business mode may not be included in the file list. In addition, it can display an indictor, which indicates that the file corresponds to the privacy/business mode, on the file list.

Although the user access authority is set per mode in the above description, it can be set per application, content or data if desired. Therefore, a user authorized with the user access authority can check the same content, whereas an unauthorized user is unable to check the same content.

According to another embodiment of the present invention, each of a plurality of modes can be discriminated in accordance with at least one of an application configuration, a content configuration and a data configuration. Each of a plurality of the modes can configure an application different per mode. Even if an application is a common application, each of a plurality of the modes can configure a content or data corresponding to the application differently.

In this instance, if the configuration of the application is different, it means that at least one application (hereinafter named a first dedicated application) dedicated to a first mode and at least one application (hereinafter named a common application) in common with the first mode and a second mode are executed in the first mode or it can mean that at least one application (hereinafter named a second dedicated application) dedicated to the second mode and at least one application (hereinafter named a common application) in common with the first mode and the second mode are executed in the second mode (cf. FIG. 10C).

If the configuration of the content/data is different, it can include both a circumstance in which a substance of the content/data is different and a circumstance in which a substance of the content/data is different in part. Specifically, the latter circumstance can mean that a substance of a specific content corresponding to each of the first mode and the second mode is different even if the specific content is designated to both of the first mode and the second mode. This is enabled in a manner of configuring a data field different per mode for the same content or data.

Figure 9A:
Figure 9A:

This is explained in detail with reference to FIGS. 9A and 9B as follows. Referring to FIG. 9A, in storing the same counterpart information, the mobile terminal 100 designates different contacts 911 and 921 and different emails 912 and 922 to a private mode and a business mode, respectively, further designates a blog address 913 and a birthday information 914 to the private mode, and further designates an approval authority 923, a rank 924 and a department 925 to the private mode.

Referring to FIG. 9B, in storing the same schedule, even if a content and participant information 931 and a content and participant information 941 are identically designated to a private mode and a business mode, respectively, the mobile terminal 100 can further designate a time information 932 to the private mode and is also able to further designate a conference room information 942 and a notification 943 to the business mode.

Figure 10A:
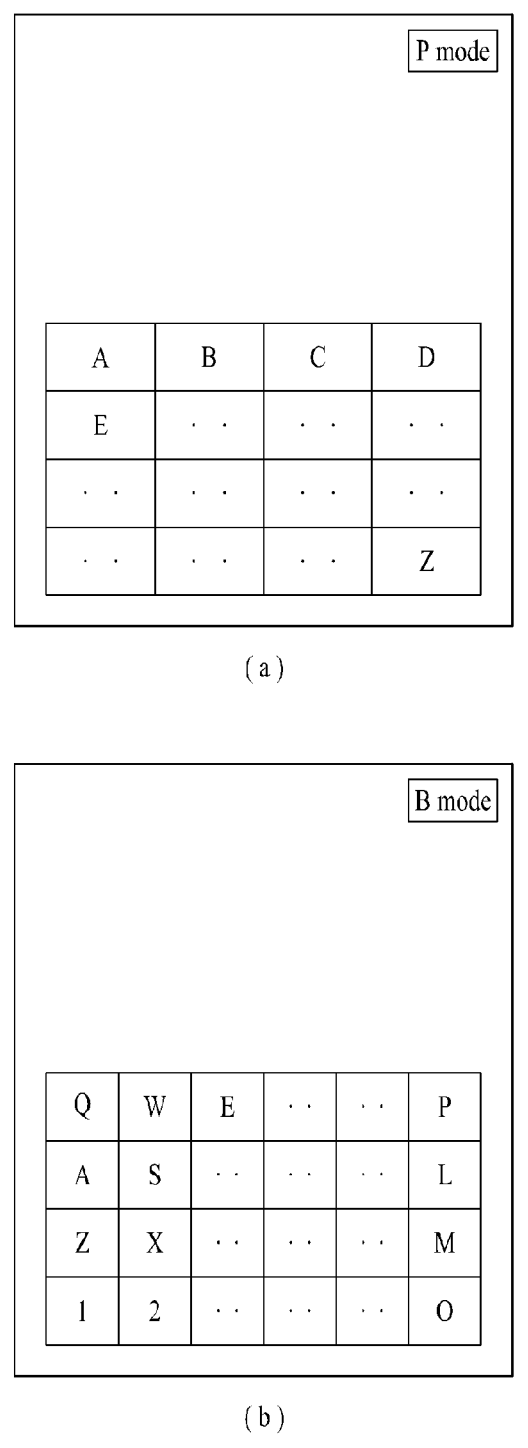
Figure 10B:
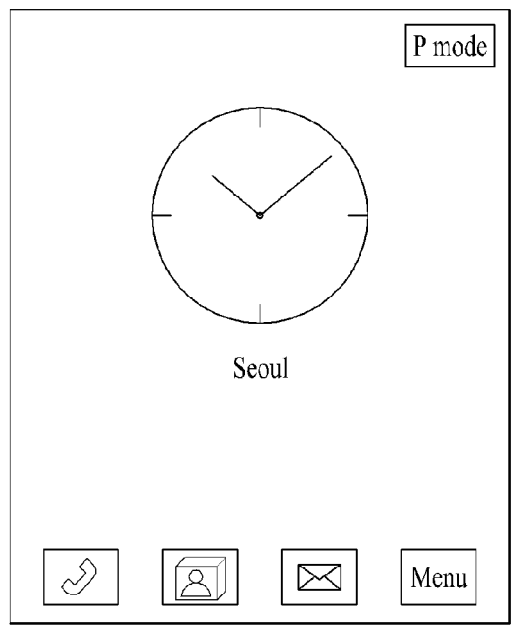
Figure 10B:
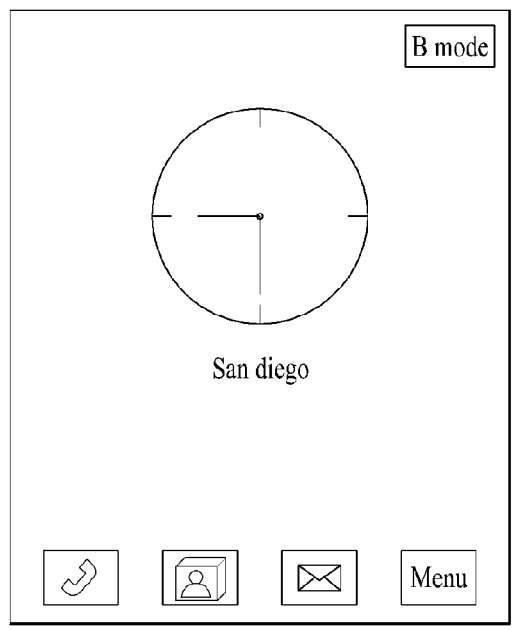

The mobile terminal 100 can set a keypad type different per mode (FIG. 10A) or can set a time zone different per mode (FIG. 10B). The mobile terminal 100 can set a different application and a different backup level of information associated with the application per mode. For instance, the mobile terminal 100 backs up information of a recent week in the private mode and is also able to back up information of a recent month or real-time information in the business mode. Of course, the backup level per mode is set by a user or can be randomly set by the controller 180.

In particular, in the business mode, if a counterpart terminal is not in the business mode or a working hour (or a holiday) currently in consideration of a status (e.g., a currently activated mode, a current location, a time zone, etc.) of the counterpart terminal, with which the mobile terminal 100 currently attempts to contact, the mobile terminal 100 informs a user of the unavailability of the counterpart terminal to enable the user to select whether to make a contact. In doing so, the mobile terminal 100 can receive information indicating the status of the counterpart terminal from the counterpart terminal or a company server and is then able to obtain the status of the counterpart terminal using the received information.

In the business mode, it can modify all previously-stored schedules to be fitted to a currently belonging time zone by reflecting a current time zone (in the event that a time zone is changed).

When there is no user input action made for a predetermined period of time in the business mode, it can lock or shut down the business mode automatically or in accordance with a user selection. In this instance, in order to unlock the locked state or cancel the shutdown, a user authentication information corresponding to the business mode is input or an authentication should be granted by the company server. Moreover, in the business mode, when an overseas roaming function is loaded on a user terminal, if a current location of a user is domestic, the overseas roaming function is automatically deactivated. If a current location of a user is overseas, the overseas roaming function can be automatically activated.

According to a fifth embodiment, when at least one common application is executed, each of a plurality of modes can vary its feature to correspond to a currently activated mode. In other words, when a specific application is a common application of a first mode and a second mode, the feature of the specific application can vary in accordance with whether the currently activated mode is the first mode or the second mode.

In this instance, if a feature varies per mode, it can mean that a configuration (e.g., a corresponding content/data configuration included), display or security of an application is varied.

For instance, if a feature varies per mode, it ca mean that a structure (e.g., configuration of a corresponding menu item) of an application, an executed screen (e.g., background image, letter type, letter size, provided information, etc.) of an application, a configuration of content/data associated with an application (cf. FIG. 9A, FIG. 9B), an application function, a security of an application (or, content, data, etc.) or the like is different per mode. Of course, as the examples of the application features are just exemplary, any instance of configuring a common application to be different per mode is applicable to the present embodiment.

For instance, when the application function is different, a photographing function is allowed to a camera in a private mode but may not be allowed in a business mode. In another instance, when an authority of access to an application is different, a phonebook provides a counterpart name, a phone number and a personal email address in a private mode and can further provide a company email address, a rank, a department and an approval authority information in a business mode.

This is explained in detail with reference to FIG. 10C as follows. For clarity and convenience of the following description, assume that a plurality of modes include a private mode and a business mode.

Figure 10C:
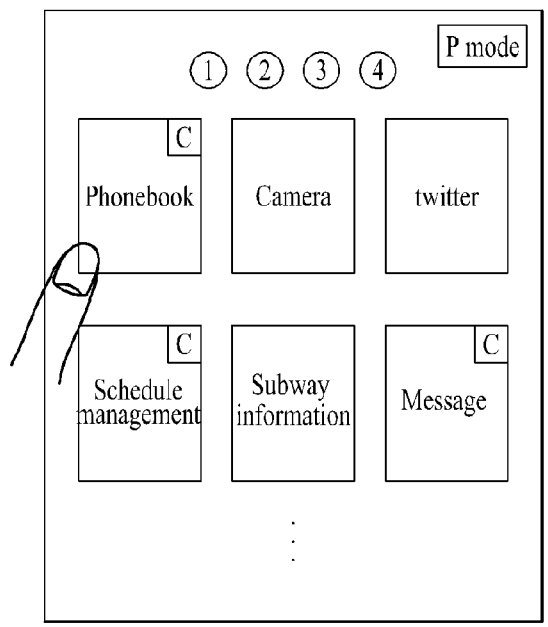
Figure 10C:
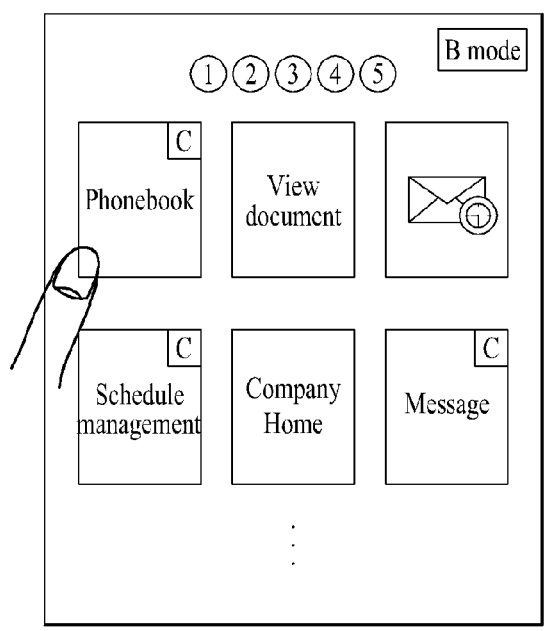

Referring to FIG. 10C, the mobile terminal 100 can receive an input of an execution command signal for executing a phonebook (i.e., an example of a common application) from a user.

The mobile terminal 100 determines a mode activated at the input timing point of the execution command signal. If a private mode is currently activated, the mobile terminal 100 executes the phonebook in accordance with a feature corresponding to the private mode and then displays an executed screen of the phonebook (cf. FIG. 6A or FIG. 9A(a)). On the contrary, if a business mode is activated, the mobile terminal 100 executes the phonebook in accordance with a feature corresponding to the business mode and then displays an executed screen of the phonebook (cf. FIG. 6B or FIG. 9A(b)).

For instance, when a security of an application is different is explained as follows. First of all, when attempting to execute a common application in a first mode, an authentication procedure is not requested or a low-level security set authentication information needs to be input. Yet, when attempting to execute a common application in a second mode, an authentication procedure is requested or a high-level security set authentication information should be input. In doing so, the application execution can include an output of content or data associated with the application as well as an executed screen display of the application.

According to a sixth embodiment, a plurality of modes can be discriminated from each other using user information corresponding to the modes, respectively. In this instance, the user information can include a user name (or title), a user image, a user phone number, a user email address, a user blog address and the like.

For instance, first and second user information different from each other can be set for first and second modes, respectively. In particular, when a first phone number and a second phone number (e.g., dual SIM) are assigned to the mobile terminal 100, the first phone number and the second phone number can be set for the first mode and the second mode, respectively.

In the above description, the definitions of the modes mentioned in the disclosure are explained. In addition, when a plurality of modes exist, the method of discriminating a plurality of the modes is explained as well.

According to a seventh embodiment, each of a plurality of modes can be discriminated by an application group including at least one application executed in the corresponding mode.

For instance, when at least one application is executable in each of a plurality of modes, the controller 180 can configure an application group including executable application(s) per mode. Moreover, the application group can be configured in accordance with an application type as well as the corresponding mode. For example, if an application type is a call, call related applications are included in the corresponding application group. If an application type is a camera, camera related applications can be included in the corresponding application group.

Moreover, the mobile terminal 100 displays a per-mode group identifier corresponding to a per-mode application group on the screen. If a specific group identifier is selected, the mobile terminal 100 can display indicators of applications belonging to the corresponding application group or can switch a current mode to a mode corresponding to the specific group identifier (assuming that it is not a currently activated mode).

According to an embodiment of the present invention, when running an application in an activated state of a prescribed one of a plurality of modes, the mobile terminal 100 displays information related to the running application and is also able to identifiably display that the displayed information corresponds to a prescribed mode.

In the following description, a method of displaying information in a mobile terminal according to an embodiment of the present invention is described in detail with reference to the accompanying drawings. For clarity and convenience of the following description, assume that a plurality of modes includes a first mode and a second mode. Of course, embodiments in the following description are applicable to a circumstance in which at least two or more modes are implemented.

First of all, in order to perform information displaying method according to an embodiment of the present invention, the mobile terminal 100 implements a first mode and a second mode and is then able to selectively activate one of the implemented first and second modes. In particular, although both of the first and second modes are implemented, the mobile terminal 100 can activate one of the first and second modes.

This is explained in detail as follows. First of all, in the implementing step, if an operating system is designated per mode, the controller 180 can implement the first mode and the second mode using a first individual operating system and a second individual operating system (i.e., a first OS and a second OS in multi-OS) corresponding to the first mode and the second mode, respectively. If an operating system per mode is common, the controller 180 can implement the first mode and the second mode using a common operating system (i.e., a single OS).

In the following description, a mode activated when OS booting per multi-OS type (cf. FIGS. 4A to 4C) is explained in detail. First of all, multi-OS types can include a first multi-OS type (e.g., Guest OS 1 and Guest OS 2 included: This type corresponds to a first scheme) and a second multi-OS type (e.g., Host OS and Guest OS: This type corresponds to a second scheme). Assume that Guest OS 1 or Host OS corresponds to a private mode. In addition, assume that Guest OS 2 or Guest OS corresponds to a business mode.

According to the first multi-OS type, if the hypervisor included in the controller 180 is driven, the mobile terminal 100 can boot Guest OS 1 and Guest OS 2 simultaneously or sequentially. If a specific one of a private mode and a business mode is selected by a user or the controller 180, the mobile terminal 100 can activate the specific mode on the Guest OS corresponding to the selected specific mode. Meanwhile, when the specific mode selecting step is omitted, the mobile terminal 100 can activate the private mode using the Guest OS 1 designated as default.

According to the second multi-OS type, the mobile terminal 100 preferentially boots the Host OS corresponding to the private mode and is then able to preload the Guest OS corresponding to the business mode, under the control of the controller 180. The mobile terminal 100 activates the private mode on the Host OS. When the pre-loaded Guest OS is booted, the mobile terminal 100 can activate the business mode on the Guest OS. Meanwhile, the mobile terminal 100 can post-load the Guest OS.

In doing so, when pre-loading the Guest OS, an initial OS booting takes a considerable time. Yet, since two operating systems are already booted after completion of the booting, a mode switching can be quickly performed. When post-loading the Guest OS, an initial OS booting is quickly performed. Yet, when switching a current mode to a mode corresponding to the Guest OS, it may take a considerable time for a mode switching due to the time consumption attributed to the Guest OS booting.

In the activating step, the mobile terminal 100 can activate either the first mode or the second mode in accordance with a user selection or a prescribed reference when an operating system booting, under the control of the controller 180.

For instance, when the single OS, any one of the first and second modes can be activated in accordance with the single OS booting. In another instance, when the multi-OS, a mode selected by a user from the first mode and the second mode or a firstly booting completed one of the first mode and the second mode is activated in accordance with the simultaneous booting of the multi-OS or a mode corresponding to the preferentially booted OS in accordance with the sequential booting of the multi-OS can be activated.

In particular, when the sequential booting of the multi-OS, the mobile terminal 100 can preferentially boot the OS, which meets a prescribed condition, under the control of the controller 180. For instance, the controller 180 can preferentially boot the OS that meets one of the conditions such as an OS having a preferential booting order, an OS designated by a user to be preferentially booted and an OS supporting a mode corresponding to a current terminal status. For instance, if a current terminal location corresponds to a specific place corresponding to a specific mode or a current hour belongs to a specific time corresponding to a specific mode, a specific mode can be preferentially activated when booting an operating system.

Figure 11:
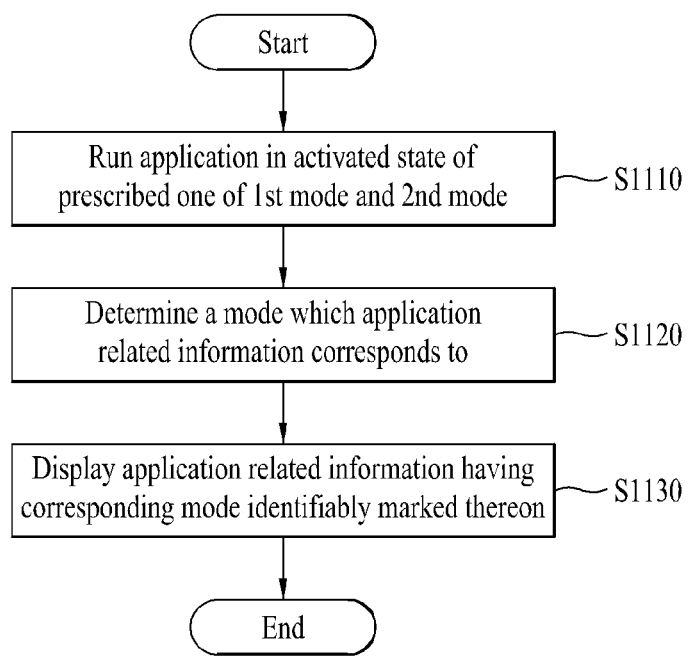
FIG. 11 is a flowchart for a method of displaying information in a mobile terminal according to one embodiment of the present invention.

FIG. 11 is a flowchart for a method of displaying information in a mobile terminal according to one embodiment of the present invention. Referring to FIG. 11, the mobile terminal 100 runs an application in an activated state of either a first mode or a second mode under the control of the controller 180 (S1110).

In the executing step S1110, the mobile ten final 100 can run the application (i.e., a dedicated application) dedicated to one of the first and second modes or the application (i.e., a common application) common to both of the first and second modes. Details of the dedicated application and the common application can refer to the former description. For example, the common application can include one of a phonebook application, a schedule management application, a message application, an email application and the like.

A determining step S1120 and other steps following the determining step S1120, which shall be explained in the following description, can be executed when externally receiving an input of a command (hereinafter named an integrated display command) for displaying information corresponding to a currently deactivated mode as well as information corresponding to a currently activated mode as information (hereinafter named an application related information) related to an application. In particular, the mobile terminal 100 can receive an input of an integrated display command from a user via the user input unit 130.

For instance, if a menu corresponding to an integrated display command is selected by a user, a key zone for receiving an input of an integrated display command is touched by a user, or a user voice or terminal motion corresponding to an integrated display command is detected, the mobile terminal 100 can receive an input of an integrated display command.

In addition, the determining step S1120 and other steps following the determining step S1120, which shall be explained in the following description, can be executed if an application running in a currently activated mode is a common application despite absence of a separate integrated display command.

In the following description, a process for receiving an input of an integrated display command is explained with reference to FIGS. 12A to 12D. For clarity and convenience of the following description, assume that a common application is run in a private mode and a business mode. In addition, assume that first and second dedicated applications capable of sharing data or contents with each other can be run in the private mode and the business mode.

Figure 12A:
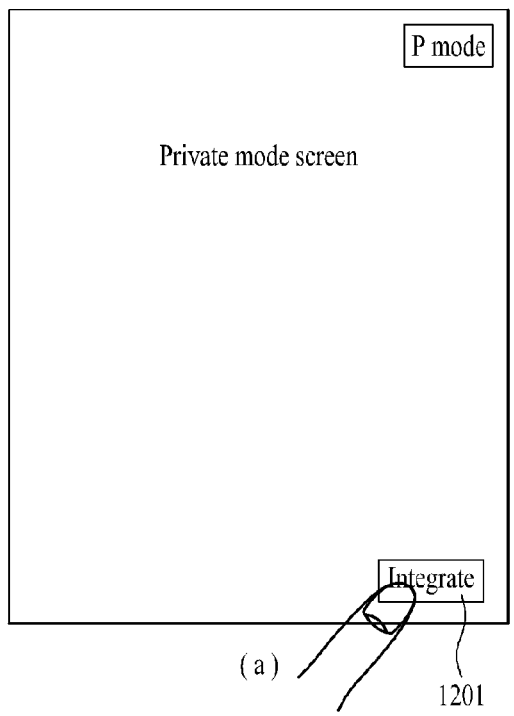
FIGS. 12A to 12D are diagrams of screen configurations for a process for receiving an input of a command for displaying a first information and a second information integratedly according to an embodiment of the present invention.
Figure 12A:
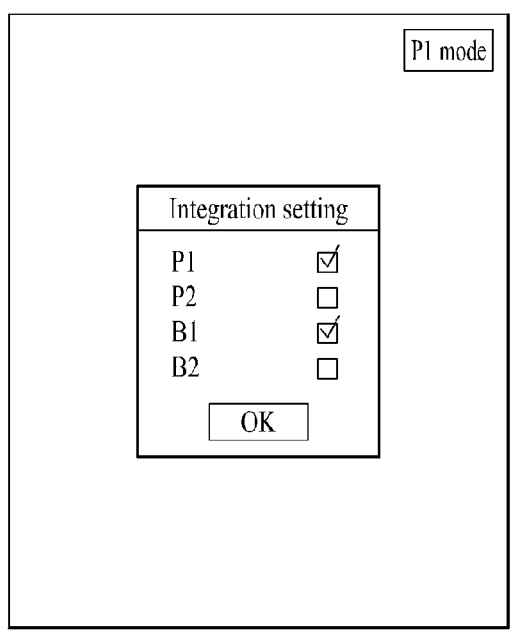
Figure 12B:
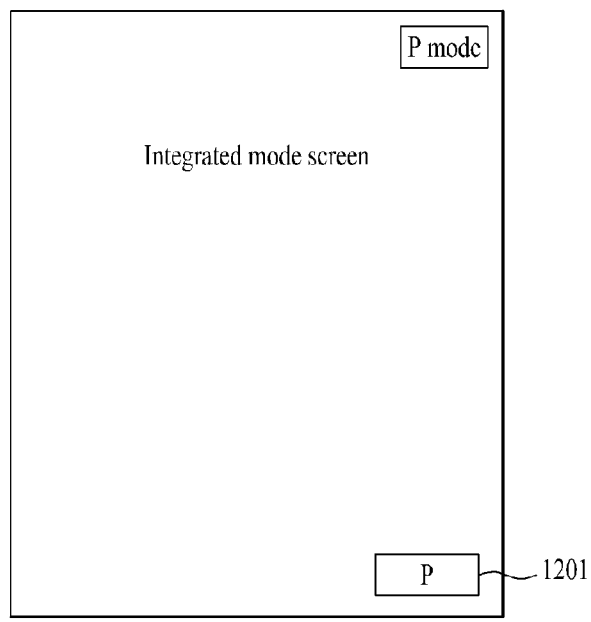

FIGS. 12A to 12D are diagrams of screen configurations for a process for receiving an input of a command for displaying a first information and a second information integratedly according to an embodiment of the present invention. Referring to FIG. 12, if a key zone 1201 for receiving an input of an integrated display command is touched by a user in an activated state of a private mode (P mode) (FIG. 12A(a)), the mobile terminal 100 can display information (hereinafter named a private information) corresponding to the private mode and information (hereinafter named a business information) corresponding to a business mode together as application related information (FIG. 12B).

In this instance, the key zone 1201 is provided in form of a toggle key. The key zone 1201 can work as a key for receiving an input of the integrated display command in FIG. 12A(a). In addition, the key zone 1201 can work as a key for receiving an input of a display command for the information corresponding to the private mode in FIG. 12B. Hence, if the key zone 1201 is touched by a user in FIG. 12B, it can go back to FIG. 12A(a).

Figure 12C:
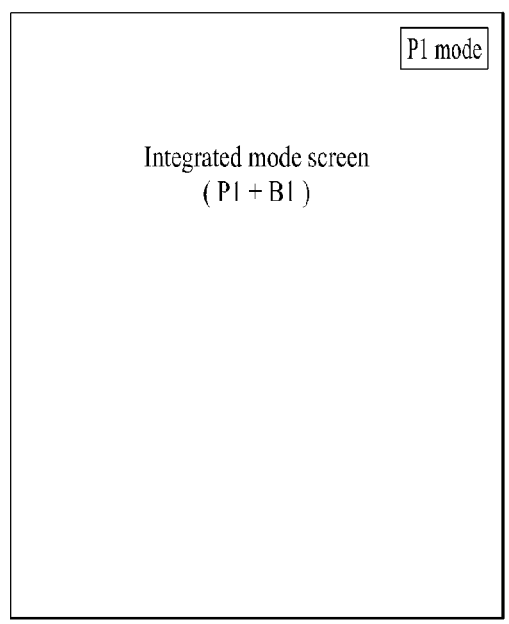

While a first private mode (P1 mode) is activated, if a signal corresponding to an integrated display command is detected, the mobile terminal 100 displays a mode list including the first private mode and other integration-possible modes (FIG. 12A(b)). If the first private mode (P1 mode) and a first business mode (B1 mode) are selected from the mode list, the mobile terminal 100 can display a first private information and a second business information together as application related information (FIG. 12C).

Figure 12D:
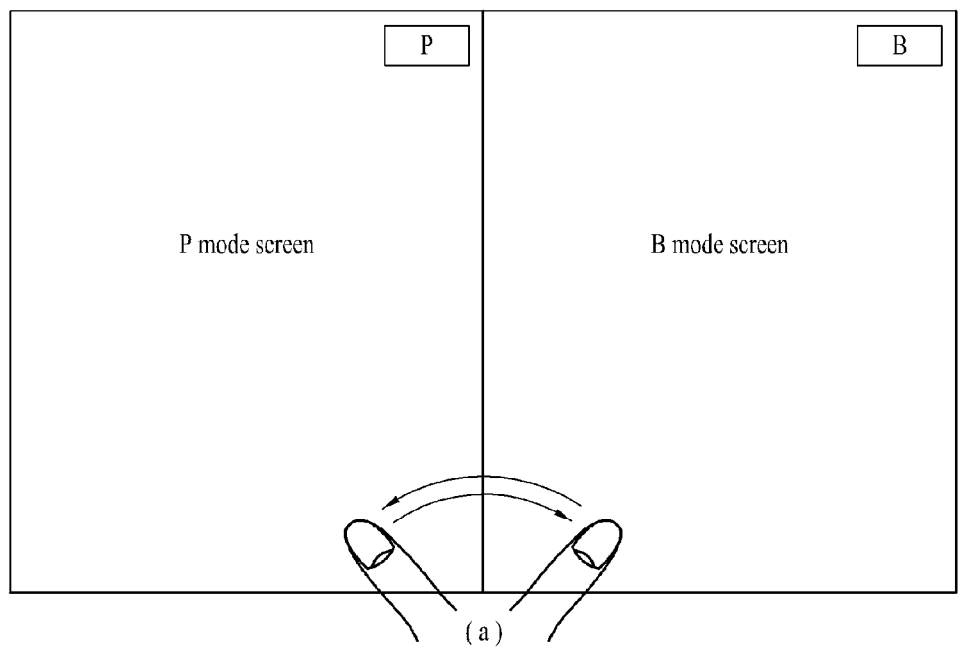
Figure 12D:
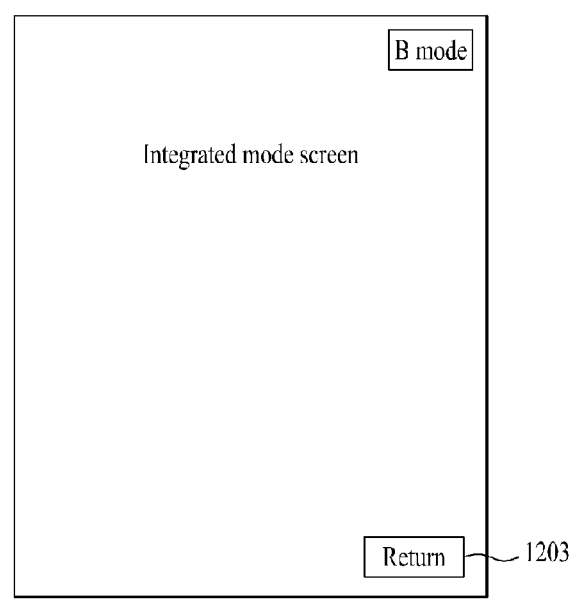

When running an application, the mobile terminal 100 partitions a screen into a plurality of regions including a first region and a second region and then displays a private information and a business information on the first region and the second region, respectively (FIG. 12D(a)). If receiving an input of an integrated display command from a user (e.g., a touch & drag action between the first region and the second region), the mobile terminal 100 can display both of the private information and the business information on a single region generated from integrating the first and second regions together (FIG. 12D(b)).

Meanwhile, the mobile terminal 100 can display a menu for receiving an input of an integrated display command using the display unit 151 and is then able to receive the integrated display command from a user using the displayed menu. Moreover, using the displayed menu, the mobile terminal 100 can receive a user selection about whether information corresponding to a currently activated mode will be displayed as an application related information or whether information corresponding to a plurality of currently implemented modes will be integratedly displayed.

Referring now to FIG. 11, the mobile terminal 100 determines whether information (hereinafter named an application related information) related to the running application corresponds to either the first mode or the second mode, under the control of the controller 180 (S1120).

In this instance, the application related information can include a content or data outputtable or available when an application running. When the application related information is an application capable of performing a function of communication with a counterpart, it can include such a counterpart information as a phone number, an email address, a messenger ID and the like.

For instance, the application related information can include a counterpart information when a phonebook application. In another instance, the application related information can include an email address when an email management application. For a further instance, the application related information can include a schedule when a schedule management application.

If the application related information corresponds to a prescribed mode, it can mean that the application related information is designated to the prescribed mode, that the application related information is referred to in an activated state of the prescribed mode, or that the application related information is executable in an activated state of the prescribed mode. Moreover, the application related information can be provided irrespective of a presence or non-presence of activation of a corresponding mode. In particular, when a currently running application is a common application, information corresponding to each of a plurality of modes, in which the common application is executable, can be provided as the application related information.

The application related information can include a tag information indicating whether the application related information is corresponds to a prescribed mode. In the determining step S1120, the mobile terminal 100 can determine the corresponding mode using the tag information included in the application related information, under the control of the controller 180. For instance, the application related information includes a mode related field. In addition, information on a mode, to which the application related information corresponds, can be included in the mode related field.

In the determining step S1120, the mobile terminal 100 determines a property of the application related information and is then able to determine a mode, to which the application related information corresponds, to match the determined property, under the control of the controller 180. For instance, in one of the application related information being a counterpart information including a company contact information, the application related information being a business related schedule (e.g., participants being members of a department, a schedule time belonging to duty hours, a place being a company conference room, etc.), and the application related information being an email or message received from a counterpart corresponding to a business mode, the mobile terminal 100 can determine that the application related information corresponds to the business mode. On the contrary, in one of the application related information being input out of duty hours, the application related information being input at a place outside a company, and a personal information such as a family name and the like being included in the application related information, the mobile terminal 100 can determine that the application related information corresponds to the private mode.

The mobile terminal 100 can receive an input of a designation command for designating the application related information to either the first mode or the second mode from a user and is then able to determine that the application related information corresponds to the mode matching the designation command.

The mobile terminal 100 displays information (hereinafter named an application related information) related to a currently running application via the display unit 151 in a manner of identifiably displaying whether the application related information corresponds to either the first mode or the second mode to match the determination result, under the control of the controller 180 (S1130).

In the displaying step S1130, the mobile terminal 100 displays information (hereinafter named a first information) corresponding to the first mode only (e.g., if there is no information corresponding to the second mode) as the application related information, displays information (hereinafter named a second information) corresponding to the second mode (e.g., if the first information does not exist) only as the application related information, or can integratedly display both of the first and second information as the application related information (e.g., if both of the first information and the second information exist).

When integratedly displaying the first information and the second information, the mobile terminal 100 can identifiably display that the first information and the second information correspond to the first mode and the second mode, respectively, under the control of the controller 180. Moreover, the display unit 151 can display the first and the second information on an integrated screen instead of individual screens, under the control of the controller 180.

The integrated display of the first and second information is explained in detail with reference to FIGS. 13A to 13D. For clarity and convenience of the following description, assume that a first mode and a second mode are a business mode and a private mode, respectively. In addition, assume that a first information and a second information are a business information and a private information, respectively.

Figure 13A:
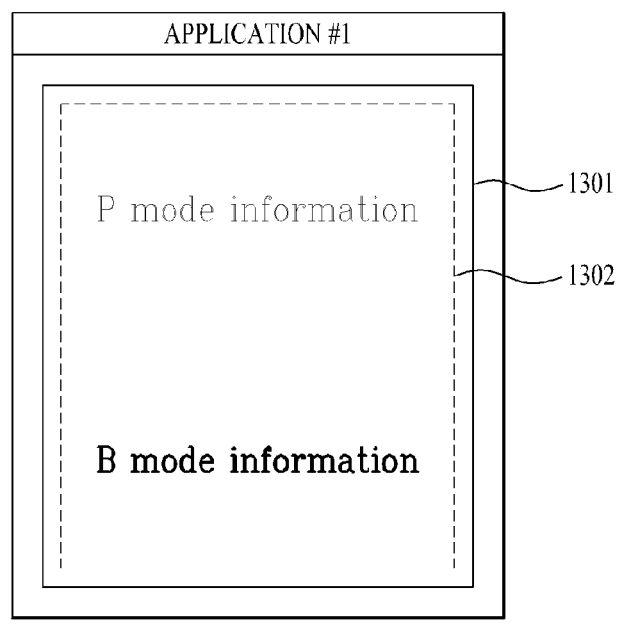
FIGS. 13A to 13D are diagrams for displaying a first information and a second information integratedly according to an embodiment of the present invention.

FIGS. 13A to 13D are diagrams for displaying a first information and a second information integratedly according to an embodiment of the present invention. Referring to FIG. 13A, while a first screen 1301 and a second screen 1302, which differ from each other in transparency, are displayed in a manner of being overlaid on each other by an overlay scheme, the mobile terminal 100 can display a business information and a private information on the first screen 1301 and the second screen 1302, respectively.

Figure 13B:
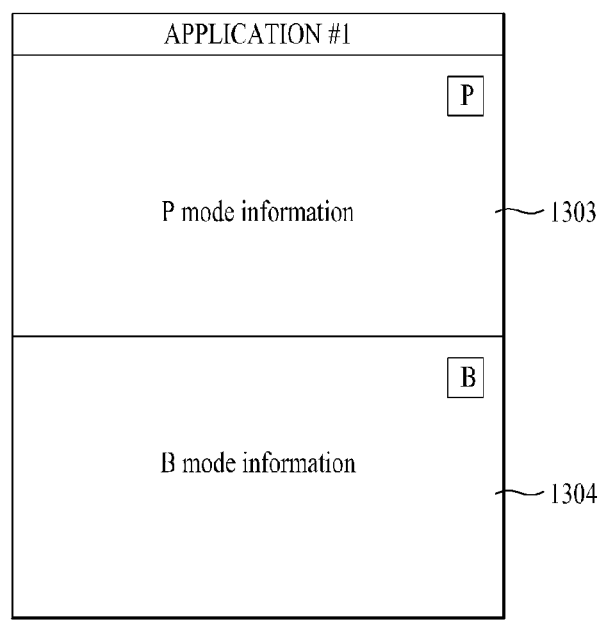

Referring to FIG. 13B, the mobile terminal 100 partitions a screen into a plurality of regions including a first region 1303 and a second region 1304 and is then able to display a private information and a business information on the first region 1303 and the second region 1304, respectively.

Figure 13C:
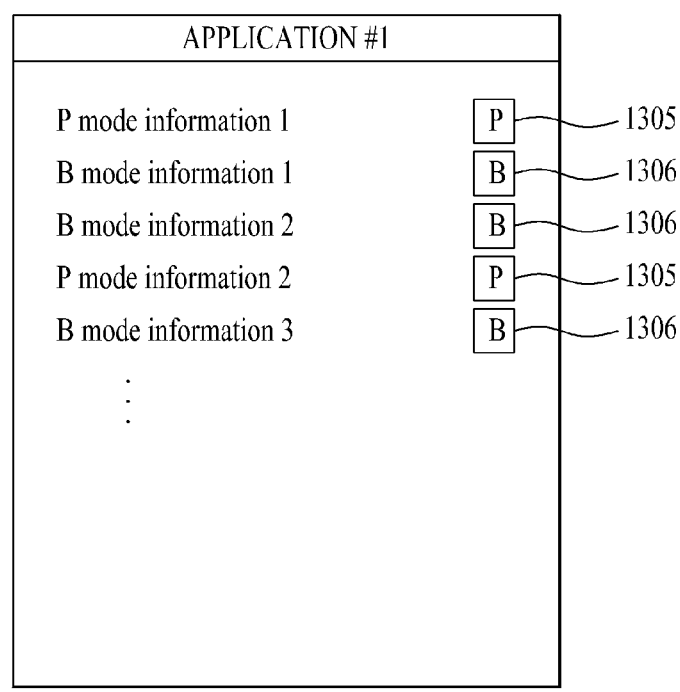

Referring to FIG. 13C, the mobile terminal 100 can integratedly display a private information and a business information both on an integrated screen. In particular, the mobile terminal 100 gives the private information an indication (P) 1305 indicating that the private information corresponds to a private mode and can give the business information an indication (B) 1306 indicating that the business information corresponds to a business mode.

Figure 13D:
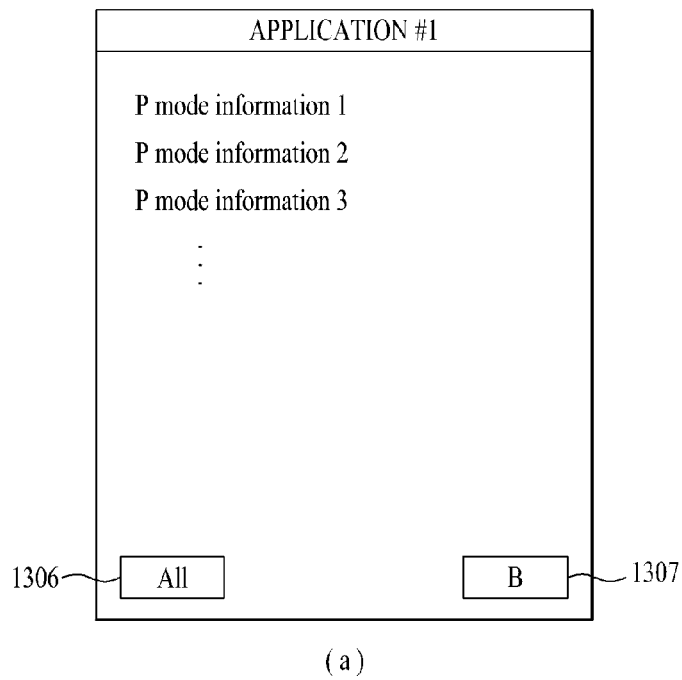
Figure 13D:
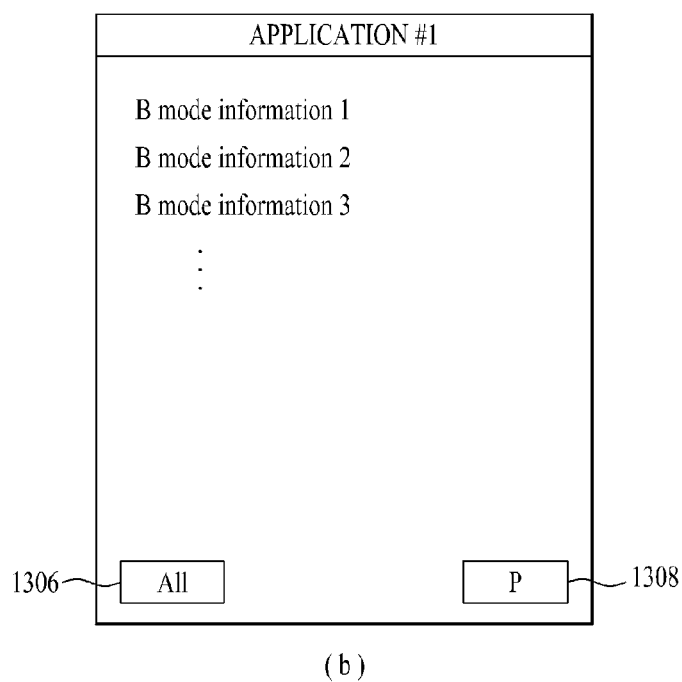

Referring to FIG. 13D, while the private information and the business information are integratedly displayed (cf. FIG. 13C), when receiving an input of a command for displaying either the private information or the business information, the mobile terminal 100 can display the private information only (FIG. 13D(a)) or can display the business information only (FIG. 13D(b)).

Moreover, when a key zone (B) 1307 is selected in FIG. 13D(a), the business information can be displayed only. In addition, when a key zone (P) 1308 is selected in FIG. 13D(b), the private information can be displayed only. Moreover, when a key zone (All) 1306 is selected in FIG. 13D(a) or FIG. 13D(b), it can return to the integrated display state of both of the private information and the business mode.

Referring now to FIG. 11, when an input of a command (hereinafter named a mode identity display command) for identifiably displaying a mode corresponding to the application related information is received via the user input unit 130, the mobile terminal 100 can identifiably display the corresponding mode for the application related information (S1130).

For instance, the mode identity display command can be input by one of a selection of a corresponding menu, a selection of a corresponding key zone, a detection of a corresponding terminal motion, an input of a corresponding user voice and the like. Of course, the mode identity display command can be input in various ways. Even if a separate mode identity display command is not given, if a currently running application is a common application, it can identifiably display the corresponding mode for the application related information.

In the displaying step S1130, the mobile terminal 100 can identifiably display the corresponding mode for the application related information by one of various schemes. For instance, it can use one of a color, symbol, image, icon, LED color, font type and the like, indicating the corresponding mode.

In the displaying step S1130, the mobile terminal 100 can limitedly display information corresponding to a mode, which is different from the currently activated mode, in the application related information under the control of the controller 180.

For instance, under the control of the controller 180, the display unit 151 displays a partial information of the information corresponding to a different mode (Case 1) or can display information corresponding to a different mode after completion of an authentication procedure (Case 2). In particular, in Case 1, it can display a partial information having a security level set equal to or lower than a predetermined reference or a partial information on which lock/security is not set by a user. In Case 2, despite the completion of the authentication procedure, it can display a whole or partial part of the information corresponding to the different mode.

The partial information in the information corresponding to the different mode means at least one information included in a plurality of information corresponding to the different mode or information corresponding to at least one of a plurality of data fields configuring a specific information corresponding to the different mode. For instance, while a phonebook application is running in an activated state of a private mode, it can display at least one counterpart information, of which security level is equal to or lower than a predetermined reference, among a plurality of counterpart information corresponding to a business mode or information corresponding to a data field, on which a security is not set by a user, among a plurality of data field configuring a specific counterpart information corresponding to the business mode only.

According to an embodiment of the present invention, when an application related information is a counterpart information, the mobile terminal 100 can display a state information of a counterpart corresponding to the counterpart information via the display unit 151 under the control of the controller 180. Moreover, the mobile terminal 100 can receive a state information from a counterpart terminal corresponding to the counterpart information or the company server 300 via the wireless communication unit 110. In doing so, the mobile terminal 100 can receive the state information if making a request for the state information. Alternatively, the mobile terminal 100 can receive the state information at a random timing point or periodically (alternatively, a real-time reception is possible).

In this instance, the state information is the information indicating a current state of a counterpart. The state information can be set by the counterpart or a counterpart terminal. In addition, the state information can include one of 'available communication', 'busy', 'in a meeting', 'off-line', 'away' and the like.

If the counterpart terminal corresponding to the counterpart information activates a mode different from the mode currently activated by the mobile terminal 100, the mobile terminal 100 displays 'off-line' as the state information of the counterpart terminal or can display a mode identification information of the mode currently activated by the counterpart terminal, under the control of the controller 180. In doing so, the mobile terminal 100 can receive information, which indicates what is the mode currently activated by the counterpart terminal, from the counterpart terminal or the company server 300 via the wireless communication unit 110. Meanwhile, the mobile terminal 100 can transmit a signal for requesting a switching to the same mode currently activated by the mobile terminal 100 to the counterpart terminal via the wireless communication unit 110.

In this instance, the mode identification information can include information capable of indicating a mode name, a mode color, a mode symbol, a mode icon and the like. When the application related information is a counterpart group including at least one counterpart information, the mobile terminal 100 can identifiably display the corresponding mode for the counterpart group and is also able to display a state information of the counterpart group, under the control of the controller 180. For instance, the mobile terminal 100 can display the corresponding mode and the state information for each of the at least one counterpart information belonging to the counterpart group.

According to an embodiment of the present invention, the mobile terminal 100 can change the application related information to correspond to a mode different from a corresponding mode under the control of the controller 180. In addition, the mobile terminal 100 can change the application related information to reflect the mode change in any one of the first mode and the second mode under the control of the controller 180.

For instance, when a specific application related information corresponding to the first mode is changed to correspond to the second mode, the specific application related information can be displayed in a following manner.

First of all, the specific application related information may not be displayed when running a specific application in the first mode if not in an integrated display state. When running the specific application, the specific application related information can be displayed (1).

Secondly, when the integrated display state, the specific application related information can be displayed together with an identity indication corresponding to the second mode.

According to an embodiment of the present invention, when receiving an input of a command for selecting an application related information via the user input unit 130, the mobile terminal 100 can provide at least one function executable in association with the selected information in accordance with whether the selected application related information corresponds to a prescribed mode under the control of the controller 180.

For instance, if the selected application related information is a specific counterpart information corresponding to a private information, the mobile terminal 100 can provide a voice call function, a message function and a messenger function. If the selected application related information is a specific counterpart information corresponding to a business mode, the mobile terminal 100 can provide an email function and a messenger function.

In the following description, how to display a first information or a second information per application is explained in detail. For clarity and convenience of the following description, assume that a first mode and a second mode are a business mode and a private mode, respectively. First of all, running a phonebook application is described as follows. In this instance, the phonebook application can be a common application common to a first mode and a second mode both.

Figure 14A:
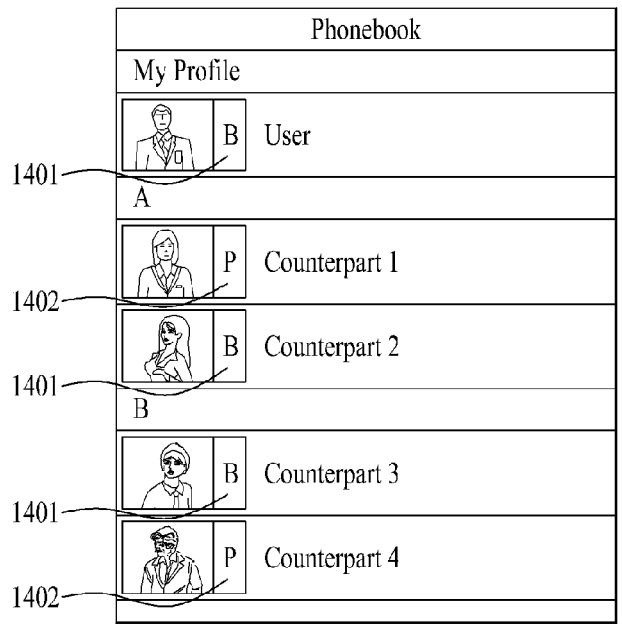
FIGS. 14A to 14E are diagrams for displaying a first information and a second information identifiably when running a phonebook application according to an embodiment of the present invention.
Figure 14A:
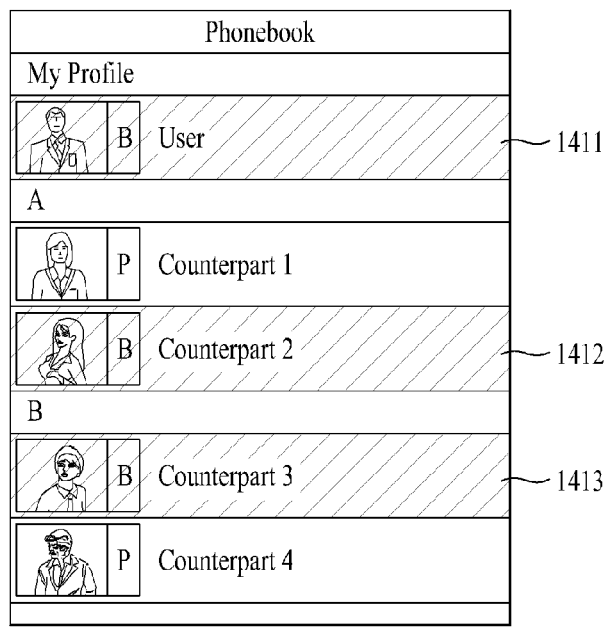

FIGS. 14A to 14E are diagrams for displaying a first information and a second information identifiably when running a phonebook application according to an embodiment of the present invention. Referring to FIG. 14A, the mobile terminal 100 can display a counterpart list including a plurality of counterpart information related to a phonebook application. Referring to FIG. 14A(a), the mobile terminal 100 displays an indicator (B) 1401 indicating a business mode for a counterpart information (e.g., Counterpart 2, Counterpart 3) corresponding to the business mode and can display an indicator (P) 1402 indicating a private mode for a counterpart information (e.g., Counterpart 1, Counterpart 4) corresponding to the private mode. Referring to FIG. 14A(b), the mobile terminal 100 can further display a counterpart information (e.g., Counterpart 2, Counterpart 3) corresponding to a currently activated business mode.

Figure 14B:
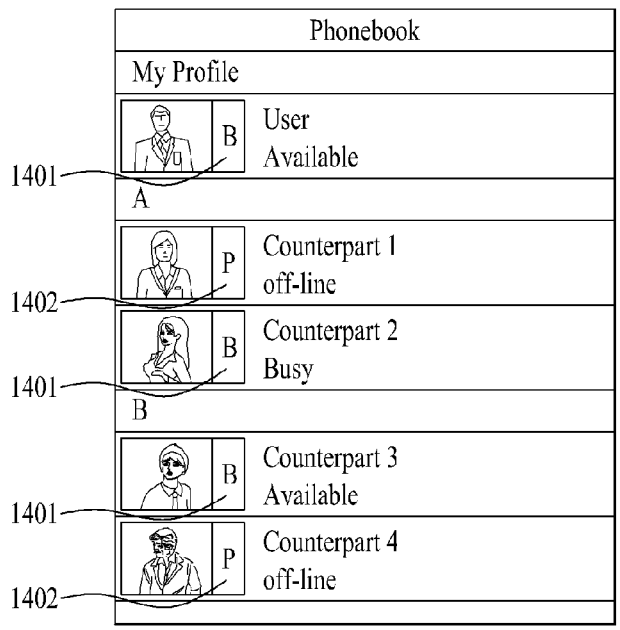
Figure 14B:
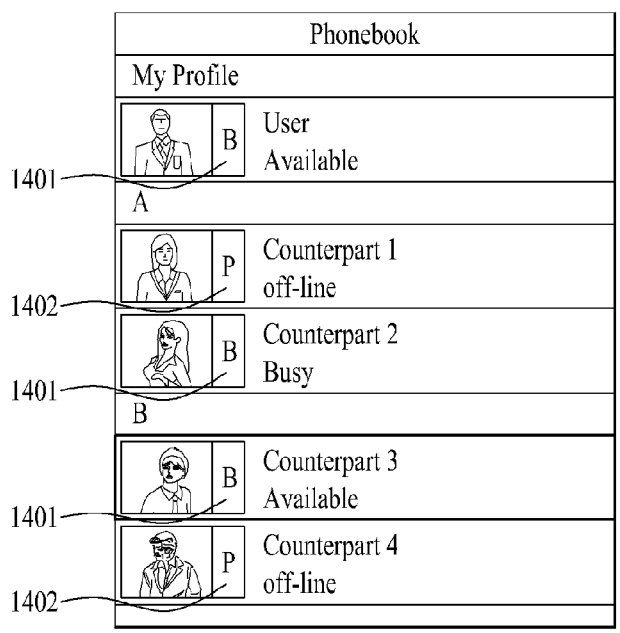
Figure 14C:
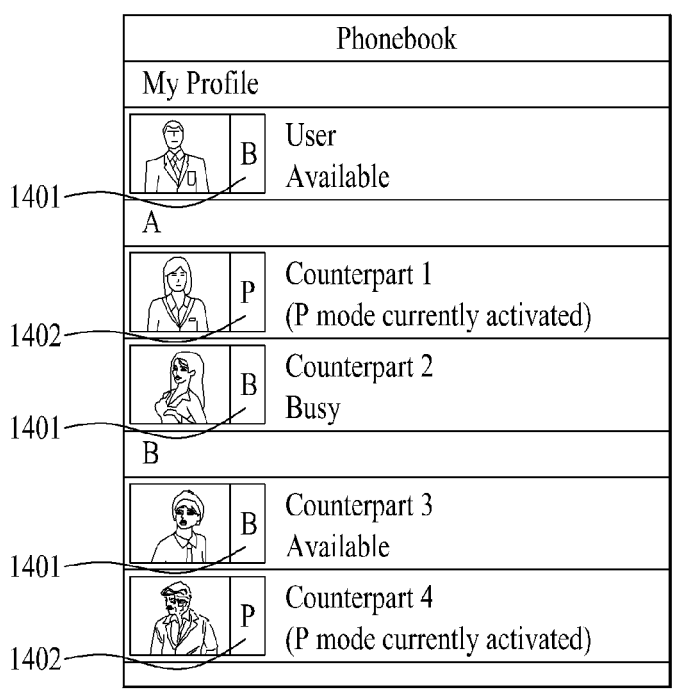

Referring to FIG. 14B or FIG. 14C, the mobile terminal 100 can display a state information on a counterpart information in a counterpart list. Referring to FIG. 14B, the mobile terminal 100 displays a state information (e.g., Counterpart 1, Counterpart 4) that activates a mode different from the mode currently activated by the mobile terminal 100 as off-line. Referring to FIG. 14C, the mobile terminal 100 can display an identification information (e.g., a mode name, etc.) on a mode currently activated by a counterpart terminal corresponding to a counterpart information (e.g., Counterpart 1, Counterpart 4). In particular, referring to FIG. 14B(b), the mobile terminal 100 can identifiably display a counterpart information (e.g., Counterpart 3) having set the same state information of its current state information (e.g., available).

Figure 14D:
Figure 14D:

Referring to FIG. 14D, the mobile terminal 100 can display a group list including at least one group and can identifiably display a corresponding mode for each of the at least one group included in the group list. In this instance, at least one counterpart information can be included in each of the at least one group.

In particular, when a mode corresponding to the at least one counterpart information belonging to the group is identical, it is displayed as shown in FIG. 14D(a). On the contrary, when a mode corresponding to the at least one counterpart information belonging to the group is different, it is displayed as shown in FIG. 14D(b). In particular, if a specific group is selected, it can display a corresponding mode for each of the at least one counterpart information belonging to the specific group (cf. FIG. 14A).

Figure 14E:
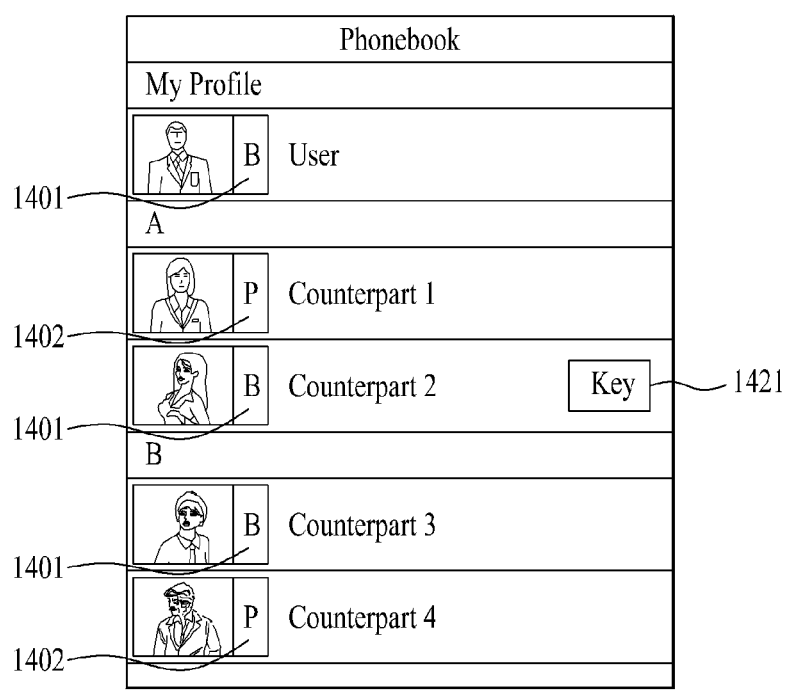

Referring to FIG. 14E, the mobile terminal 100 can give an identity indication (Key) 1421, which indicates a person having high importance, to a counterpart information of Counterpart 2 designated as a counterpart having high importance on the counterpart list. Moreover, the mobile terminal 100 can discriminate the counterpart, who is designated as the person having the high importance, from other counterparts in a manner of differentiating an indication display of an even using the corresponding counterpart information.

Referring to FIGS. 14A to 14E, the mobile terminal 100 can further display a region (hereinafter named a user region) (My Profile) corresponding to a user of the mobile terminal 100. If the user region is selected, the mobile terminal 100 can display the corresponding user information in detail and is also able to edit the corresponding user information. For instance, the user information includes a phone number, an email address and a messenger ID and is also able to include a state information of the corresponding user. Meanwhile, the user information can be provided different in accordance with a currently activated mode (e.g., a first user information for a private mode, a second user information for a business mode, etc.)

The mobile terminal 100 sets a different available communication function per user's state information or can set a different user information. For instance, if the state information is 'busy', the mobile terminal 100 can set the available communication function to a message. In another instance, if the state information is 'in a meeting', the mobile terminal 100 can set the available communication function to an email or a message. For further instance, if the state information is 'busy', the mobile terminal 100 sets the first user information. In addition, if the state information is 'in a meeting', the mobile terminal can set the second user information.

Meanwhile, if a specific counterpart information corresponds to a business mode and a counterpart corresponding to the specific counterpart information is in the course of performing a specific job, the mobile terminal 100 can display a job progressing extent for the specific counterpart information (e.g., using a graph or diagram).

The mobile terminal 100 can adjust an authority for viewing a state information of a counterpart information in accordance with a rank of a user. For instance, if a user rank is equal or higher than a predetermined rank, all state information of a counterpart information are viewable. Yet, if a user rank is lower than the predetermined rank, a specific one of state information of the counterpart information is allowed to be viewed only.

FIGS. 15A to 15D are diagrams for sorting and displaying a first information and a second information in accordance with a prescribed reference when running a phonebook application according to an embodiment of the present invention.

Figure 15A:
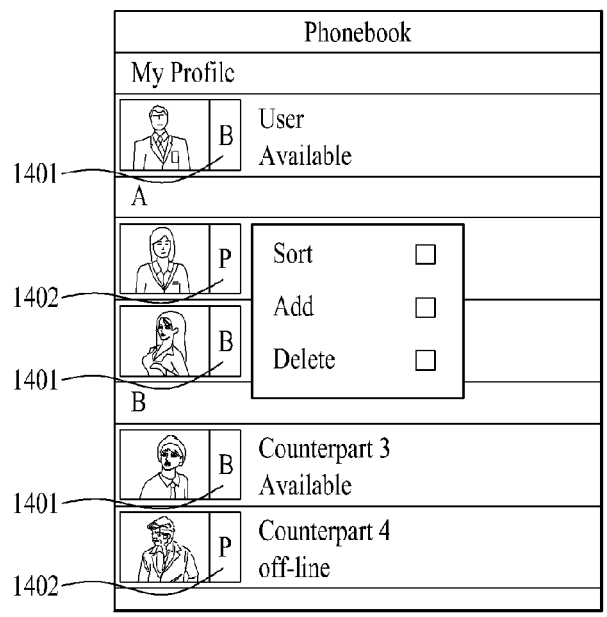
FIGS. 15A to 15D are diagrams for sorting and displaying a first information and a second information in accordance with a prescribed reference when running a phonebook application according to an embodiment of the present invention.

Referring to FIG. 15A, while a counterpart list is displayed, the mobile terminal 100 can display a window for receiving a selection of at least one of 'sort', 'add' and 'delete' from a user.

Figure 15B:
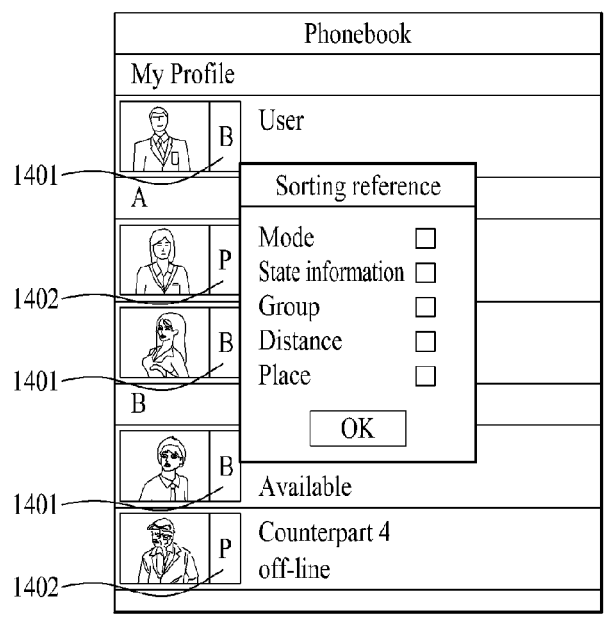

Referring to FIG. 15B, if the 'sort' is selected in FIG. 15A, the mobile terminal 100 can display a reference list constructed with selectable references. For instance, a mode, a state information, a group, a distance, a place and the like can be included in the reference list.

Figure 15C:
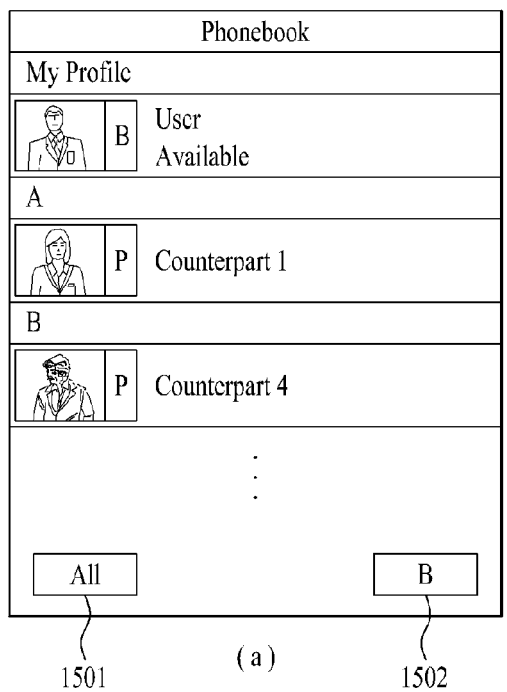
Figure 15C:
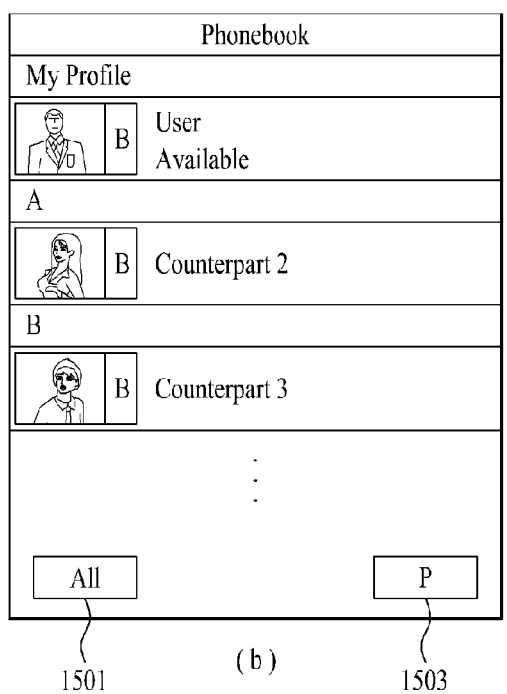

Referring to FIG. 15C, if the 'mode' is selected in FIG. 15B, the mobile terminal 100 can display a counterpart list sorted per mode. In particular, FIG. 15C(a) shows that a counterpart list constructed with counterpart information corresponding to a private mode is displayed. In addition, FIG. 15C(b) shows that a counterpart list constructed with counterpart information corresponding to a business mode is displayed. If a key zone (B) 1502 is selected in FIG. 15C(a), a screen shown in FIG. 15C(b) is displayed. If a key zone (P) 1503 is selected in FIG. 15C(b), a screen shown in FIG. 15C(a) can be displayed. If a key zone (All) 1501 is selected in FIG. 15C(a) or FIG. 15C(b), it can display a counterpart list including both a counterpart information corresponding to a private mode and a counterpart information corresponding to a business mode.

Figure 15D:
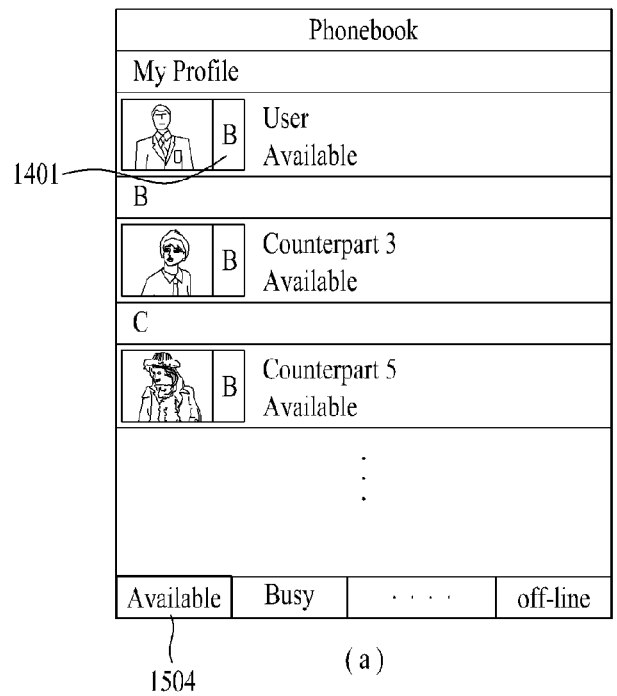
Figure 15D:
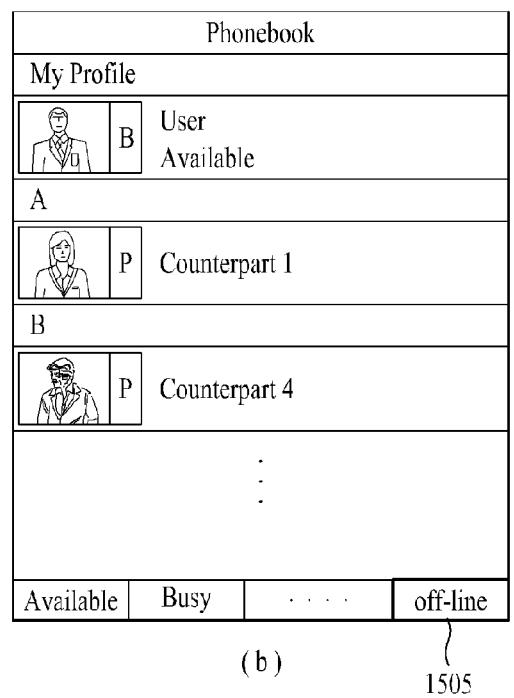

Referring to FIG. 15D, if the 'state information' is selected in FIG. 15B, the mobile terminal 100 can display a counterpart list sorted per state information. In particular, FIG. 15D(a) shows that a counterpart list including counterpart information having 'communication available (Available)' set thereon can be displayed. In addition, FIG. 15D(b) shows that a counterpart list including counterpart information having 'off-line' set thereon can be displayed. Moreover, the mobile terminal 100 provides a state information bar to a bottom side of a screen. If a prescribed state information is selected from state information included in the state information bar, the mobile terminal 100 can display a counterpart list including counterpart information having the selected state information set thereon.

Meanwhile, if the 'group' is selected in FIG. 15B, the mobile terminal 100 can display a per-group sorted counterpart list. If the 'distance' is selected in FIG. 15B, the mobile terminal 100 can display a counterpart list sorted per distance between the mobile terminal 100 and a counterpart terminal. If the 'place' is selected in FIG. 15B, the mobile terminal 100 can display a counterpart list sorted per place at which a counterpart terminal is located.

If the 'add' is selected in FIG. 15A, the mobile terminal 100 can add a counterpart information. If the 'delete' is selected in FIG. 15A, the mobile terminal 100 can delete a counterpart information. Moreover, the mobile terminal 100 receives a prescribed search condition from a user and is then able to display a counterpart list including counterpart information(s) corresponding to the input search condition.

Figure 16A:
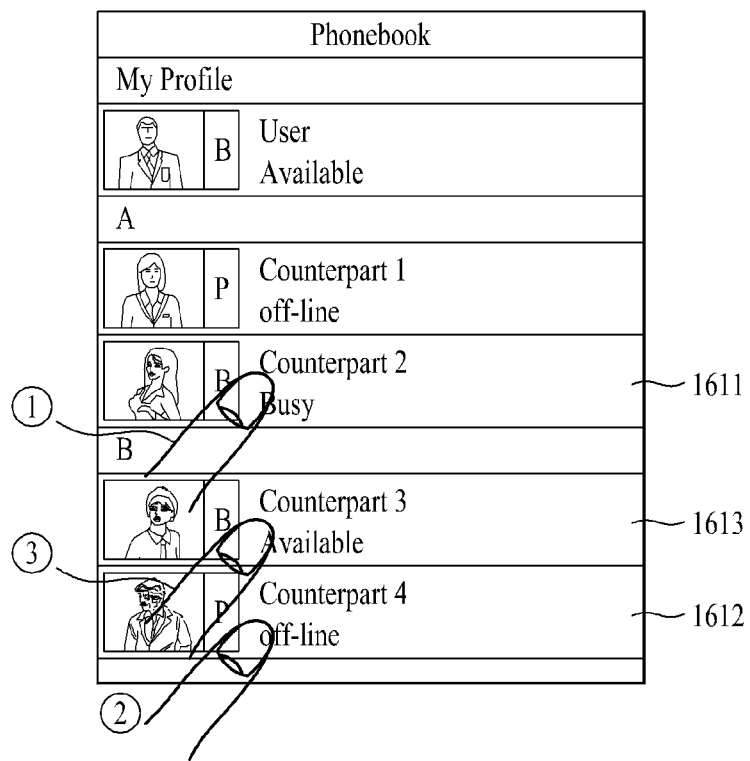
FIGS. 16A to 16C are diagrams for providing different functions for a first information and a second information, respectively, when running a phonebook application according to an embodiment of the present invention.
Figure 16B:
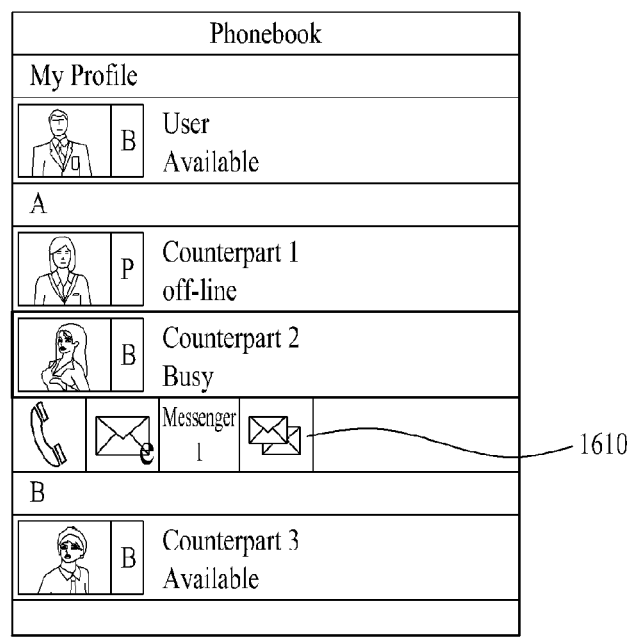
Figure 16B:
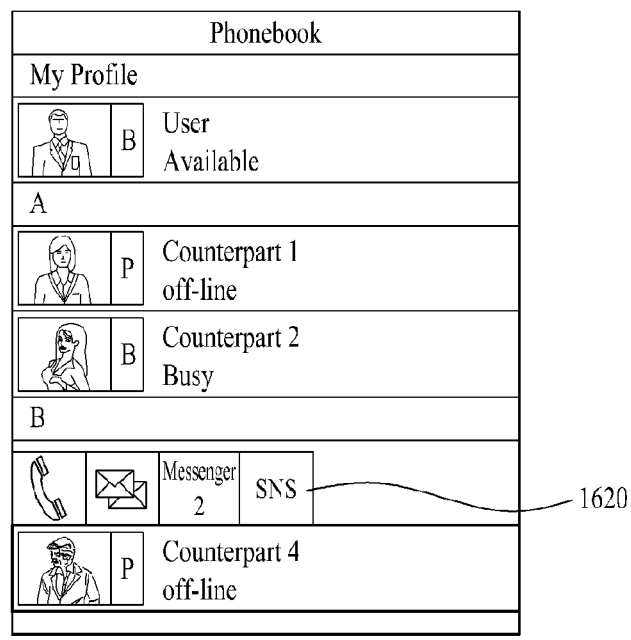
Figure 16C:
Figure 16C:

FIGS. 16A to 16C are diagrams for providing different functions for a first information and a second information, respectively, when running a phonebook application according to an embodiment of the present invention. Referring to FIG. 16A, the mobile terminal 100 can receive an input of a command for selecting a specific counterpart information included in a counterpart list from a user.

Referring to FIG. 16B, when receiving a selection of a counterpart information (Counterpart 2) 1611 corresponding to a business mode in FIG. 16A (①), the mobile terminal 100 displays a function list 1610 including such functions executable in the business mode as a voice call, an email, an in-company messenger (Messenger 1) and a message (FIG. 16B (a)). When receiving a selection of a counterpart information (Counterpart 4) 1612 corresponding to a private mode in FIG. 16A (②), the mobile terminal 100 can display a function list 1620 including such functions executable in the private mode as a voice call, a message, an external messenger (Messenger 2) and an SNS (FIG. 16B(b)).

Referring to FIG. 16C, when receiving a selection of a counterpart information (Counterpart 2) 1611 having 'busy' set thereon in FIG. 16A (①), the mobile terminal displays a function list 1630 including an email that is a function executable in a state of 'busy' (FIG. 16C(a)). When receiving a selection of a counterpart information (Counterpart 3) 1613 having 'available (i.e., communication available)' set thereon in FIG. 16A (③), the mobile terminal 100 can display a function list 1640 including such functions executable in the state of 'available' as a voice call, an email and an in-company messenger (Messenger 1).

The above-described providing function per mode corresponding to the counterpart information or the above-described providing function per state information corresponding to the counterpart information is determined by a user or the controller 180 or can be set by a counterpart corresponding to the counterpart information or a counterpart terminal.

Meanwhile, if a function non-executable for a specific counterpart information is selected, the mobile terminal 100 can perform the corresponding function in a manner of switching the non-executable function to an executable function. For instance, if an email function is unavailable for a specific counterpart information but a message function is available for the specific counterpart information, the mobile terminal 100 can perform the message function despite that the email function is selected for the specific counterpart information. Therefore, if an email is written for the specific counterpart information, the mobile terminal 100 changes the written email into a message form and is then able to send a corresponding message by a message sending scheme.

Figure 17A:
FIGS. 17A to 17C diagrams for limitedly providing information corresponding to a specific mode when running a phonebook application according to an embodiment of the present invention.
Figure 17B:
Figure 17B:
Figure 17C:
Figure 17C:

FIGS. 17A to 17C diagrams for limitedly providing information corresponding to a specific mode when running a phonebook application according to an embodiment of the present invention. For clarity and convenience of the following description, assume that a private mode is currently activated. Referring to FIG. 17A, when receiving an input of a user selection for a counterpart information (Counterpart 2) corresponding to a business mode in a counterpart list, the mobile terminal 100 can limitedly provide a counterpart information (hereinafter named a second counterpart information) corresponding to the Counterpart 2.

Referring to FIG. 17B, only if an authentication procedure is performed (FIG. 17B(*a*)), the mobile terminal 100 is bale to provide a user with the second counterpart information. In this instance, a whole part of the second counterpart information can be provided. Alternatively, an allowed partial substance of the second counterpart information can be provided only.

Referring to FIG. 17C, the mobile terminal 100 announces that the selected counterpart information corresponds to the business mode and also enables a user to select whether to view the providing-allowed partial substance (i.e., disclose a partial information only) or whether to view the whole second counterpart information (i.e., B mode switching) (FIG. 17C(*a*)). If the 'disclose a partial information only' is selected in FIG. 17C(*a*), the mobile terminal 100 can display the partial substance allowed to be disclosed in the private mode only (FIG. 17C(*b*)).

Figure 18A:
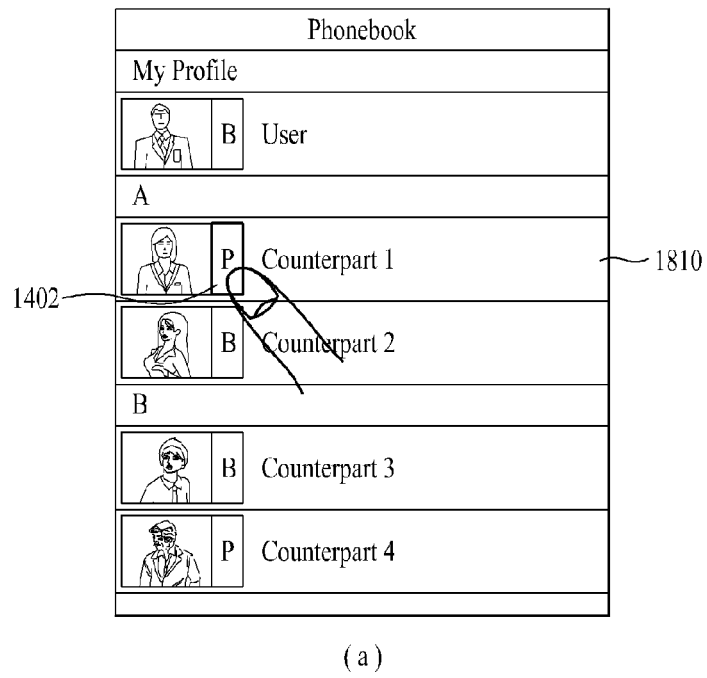
FIGS. 18A to 18C are diagrams for changing a first information to correspond to a second mode when running a phonebook application according to an embodiment of the present invention.
Figure 18A:
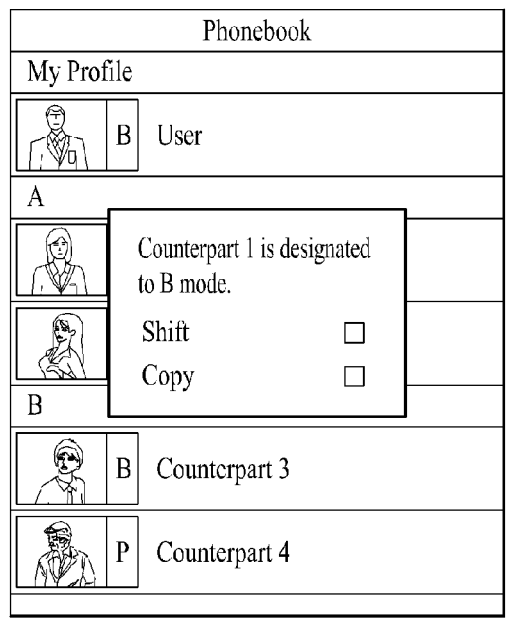
Figure 18B:
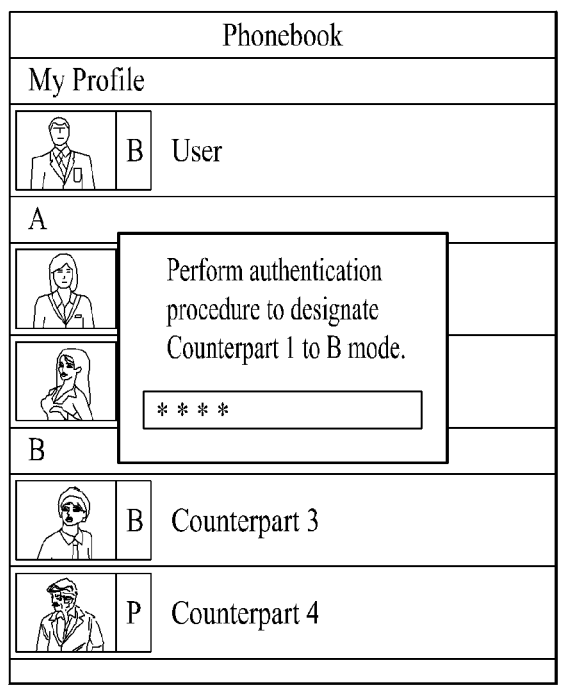
Figure 18C:
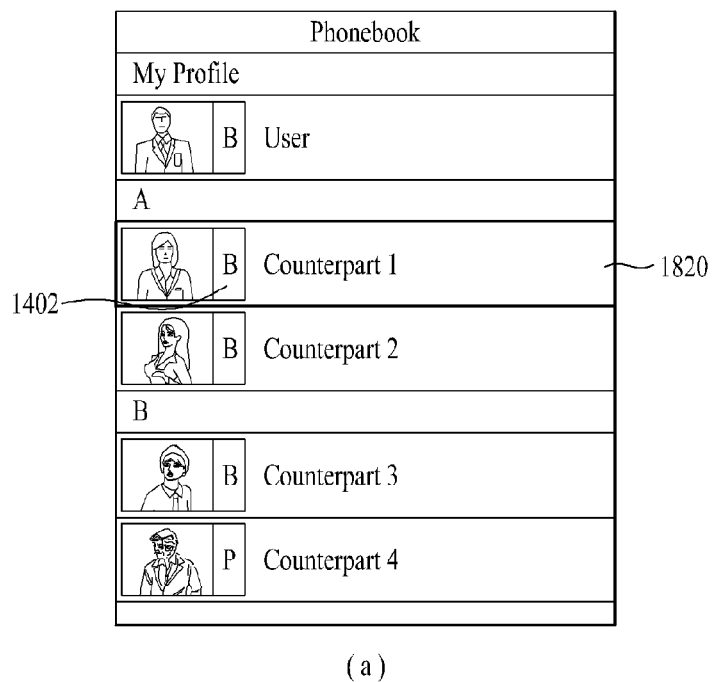
Figure 18C:
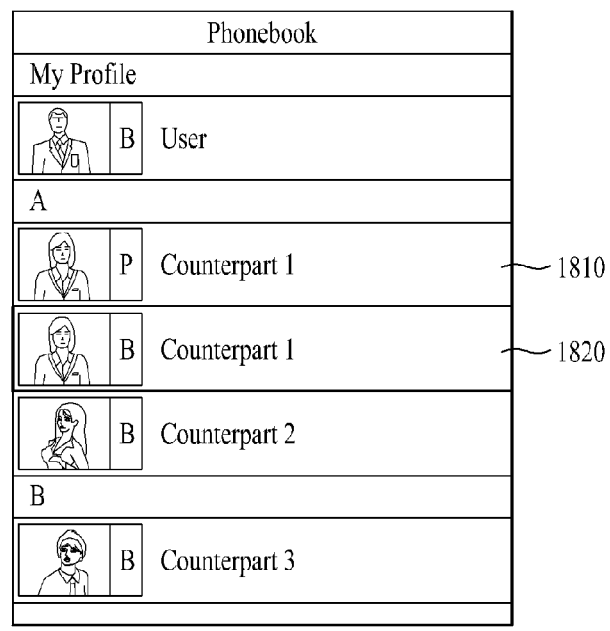

FIGS. 18A to 18C are diagrams for changing a first information to correspond to a second mode when running a phonebook application according to an embodiment of the present invention. Referring to FIG. 18A, when receiving an input of a change command for a change into a business mode for a counterpart information (Counterpart 1) 1810 corresponding to a private mode from a user (FIG. 18A(*a*)), the mobile terminal 100 enables a user to select whether to shift the change command input counterpart information (hereinafter named a first counterpart information) to the business mode or to copy the first counterpart information (FIG. 18A(*b*)).

In this instance, the 'shift' means that the first counterpart information is shifted to the business mode from the private mode (e.g., after the shift, the first counterpart information corresponds to the business mode only). In addition, the 'copy' means that the first counterpart information is copied in the private mode and is then pasted to the business mode (e.g., after the copy, the first counterpart information corresponds to both of the private mode and the business mode).

In particular, the change command can be input for a mode indicator (P) 1402 of the first counterpart information. The mode indicator (P) 1402 is provided in form of a toggle key to change a corresponding mode by a user manipulation. Referring to FIG. 18B, the mobile terminal 100 can request a prescribed authentication procedure to change the first counterpart information to correspond to the business mode. Therefore, the first counterpart information can be changed only if a valid authentication procedure is completed.

Referring to FIG. 18C, if the first counterpart information is completely changed to correspond to the business mode, the mobile terminal 100 can display an indicator (B) 1402, which indicates that the first counterpart information 1820 corresponds to the business mode, when the shift (FIG. 18C(*a*)). If the first counterpart information is completely changed to correspond to the business mode, the mobile terminal 100 can display an indicator (P), which indicates that the first counterpart information 1820 corresponding to the private mode corresponds to the business mode, and an indicator (B), which indicates that the first counterpart information 1820 corresponding to the business mode corresponds to the business mode, when the copy (FIG. 18C(*b*)). In this instance, the former first counterpart information 1820 can be configured different from the latter counterpart information 1820.

In the following description, running a schedule management application is explained. In this instance, the schedule management application can include a common application common to a private mode and a business mode.

FIGS. 19A and 19B are diagrams for identifiably displaying a first information and a second information when running a schedule management application according to an embodiment of the present invention. Referring to FIG. 19A, the mobile terminal 100 can display a schedule in form of a calendar. In particular, the mobile terminal 100 identifiably displays an indication of a business mode (e.g., B1 on February $3^{rd}$, B2 on February $8^{th}$, B3 on February $10^{th}$, B4 on February $12^{th}$) on a display region of a date having a schedule (hereinafter named a business schedule) corresponding to the business mode. In addition, the mobile terminal 100 identifiably displays an indication of a private mode (e.g., P1 on February $1^{st}$, P2 on February $8^{th}$, P3 on February $12^{th}$) on a display region of a date having a schedule (hereinafter named a private schedule) corresponding to the private mode.

Referring to FIG. 19B, the mobile terminal 100 can display a schedule in a list form and can identifiably display a business schedule or a private schedule per date. Moreover, each of the private schedule and the business schedule can be identifiably displayed using a display color, a letter font, an identification icon, an identification symbol, an identification image and the like.

Figure 20A:
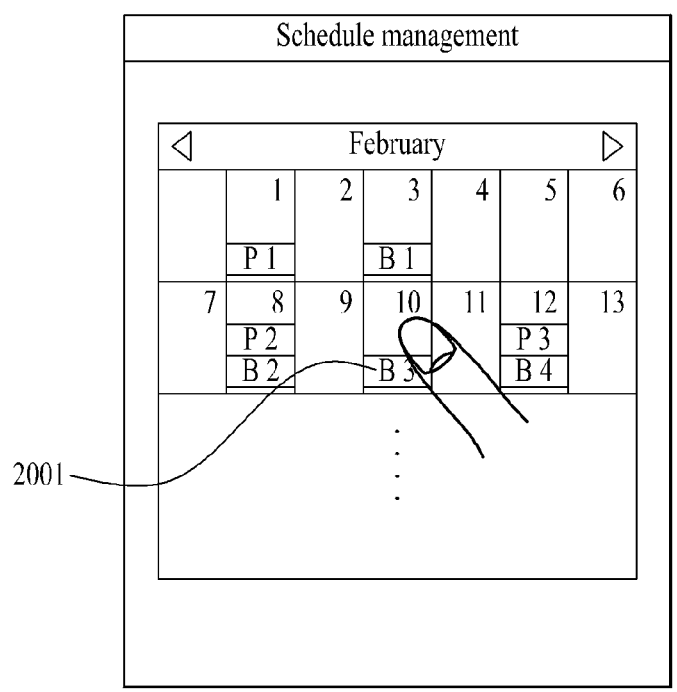
FIGS. 20A to 20C are diagrams for limitedly providing information corresponding to a specific mode when running a schedule management application according to an embodiment of the present invention.
Figure 20B:
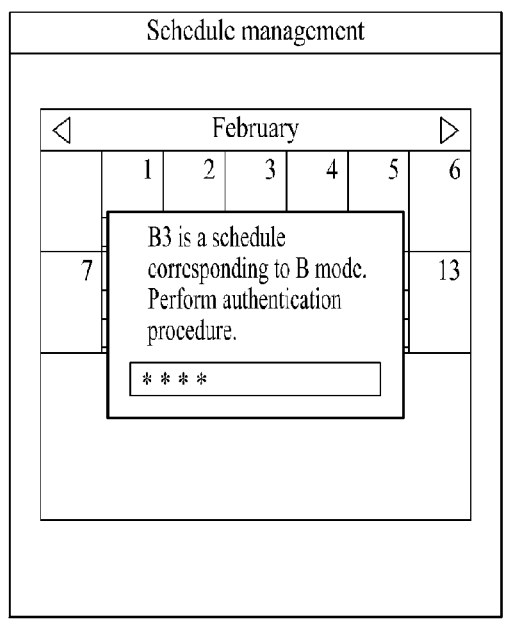
Figure 20C:
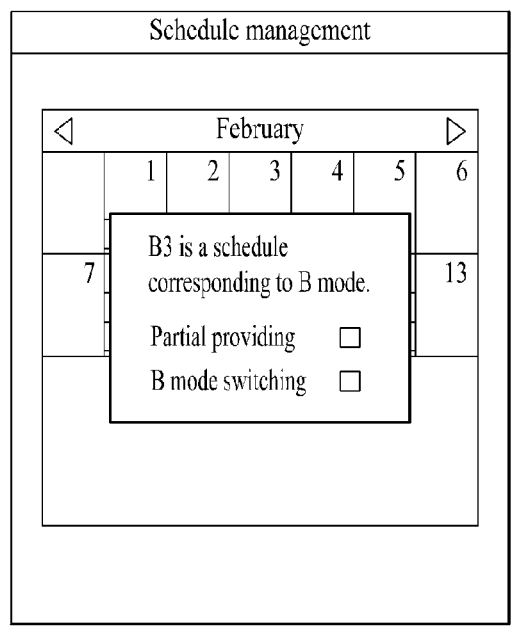

FIGS. 20A to 20C are diagrams for limitedly providing information corresponding to a specific mode when running a schedule management application according to an embodiment of the present invention. For clarity and convenience of the following description, assume that a private mode is currently activated.

Referring to FIG. 20A, when receiving an input of a user selection for a business schedule (B3) 2001 in FIG. 19A, the mobile terminal 100 can limitedly provide a substance of the business schedule (B3) 2001. Referring to FIG. 20B, only if an authentication procedure is performed (FIG. 20B(*a*)), the mobile terminal 100 is bale to provide a user with a whole substance of the business schedule (B3) 2001 (FIG. 20B(*a*)). Occasionally, in spite that the authentication procedure is performed, a providing-allowed partial substance of the whole substance of the business schedule (B3) 2001 can be provided only.

Referring to FIG. 20C, the mobile terminal 100 announces that the business schedule (B3) 2001 corresponds to the business mode and also enables a user to select whether to view the providing-allowed partial substance (i.e., partial providing) or whether to view the whole business schedule (B3) 2001 (i.e., B mode switching) (FIG. 20C(a)). If the 'partial providing' is selected in FIG. 20C(a), the mobile terminal 100 can display the partial substance, which is allowed to be disclosed in the private mode, of the whole substance of the business schedule (B3) 2001 only (FIG. 20C(b)).

Figure 21A:
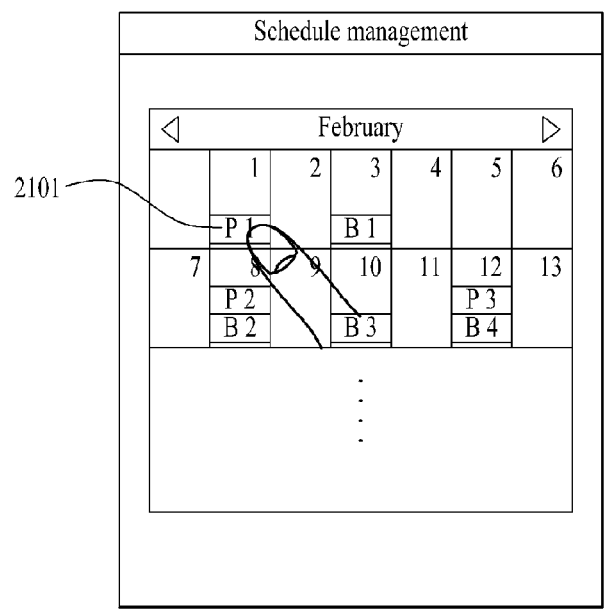
Figure 21B:
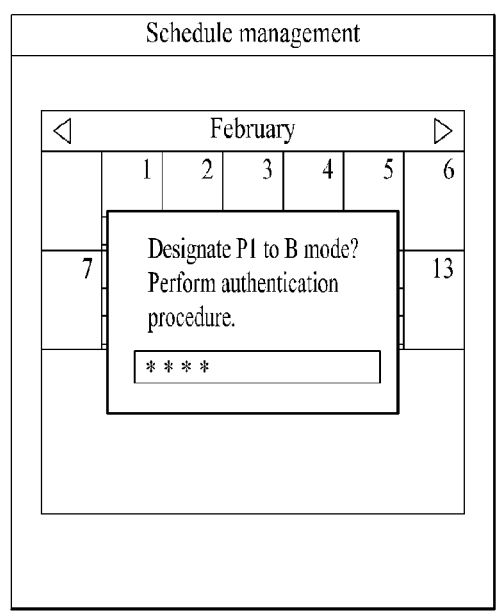

FIGS. 21A to 21C are diagrams for changing a first information to correspond to a second mode when running a schedule management application according to an embodiment of the present invention. Referring to FIG. 21A, the mobile terminal 100 can receive an input of a change command for a change to a business mode for a private schedule (P1) 2101 from a user. For instance, the change command can be input by a touch action on an indication display part of the private schedule (P1) 2101.

Referring to FIG. 21B, when a change into a business mode, the mobile terminal 100 can request a prescribed authentication procedure (FIG. 21B(a)). After the authentication procedure has been validly performed, the mobile terminal 100 can change the private schedule (P1) 2101 into a business schedule (B5) and can give an indication display (B5) indicating that the private schedule (P1) 2101 corresponds to the business mode to the private schedule (P1) 2101.

FIGS. 22A to 22B are diagrams for modifying information corresponding to a specific mode when running a schedule management application according to an embodiment of the present invention. Referring to FIG. 22A, when a business schedule (B2) and a private schedule (P2) belong to the same date, if a time corresponding to the business schedule (B2) is equal to a time corresponding to the private schedule (P2) or the former time is overlapped with the latter time in part, the mobile terminal 100 can delete or modify a prescribed one of the business schedule (B2) and the private schedule (B2).

Referring to FIG. 22B, if 'delete' is selected in FIG. 22A, the mobile terminal 100 can delete the private schedule (P2) in accordance with a user selection. Referring to FIG. 22C, if 'modify' is selected in FIG. 22A, the mobile terminal can modify the time corresponding to the business schedule (B2) not to be overlapped with the private schedule (P2) in accordance with a user selection. Moreover, the mobile terminal 100 can shift either the business schedule (B2) or the private schedule (P2) to a different date.

Meanwhile, an embodiment, which relates to a per-reference sort display, among phonebook application embodiments is applicable to a schedule management application as well.

Figure 23A:
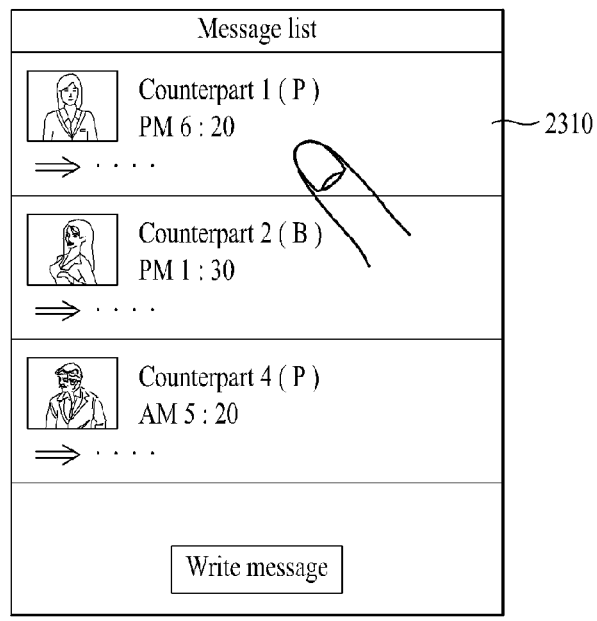
FIGS. 23A and 23B are diagrams for identifiably displaying a first information and a second information when running a message application according to an embodiment of the present invention.
Figure 23B:
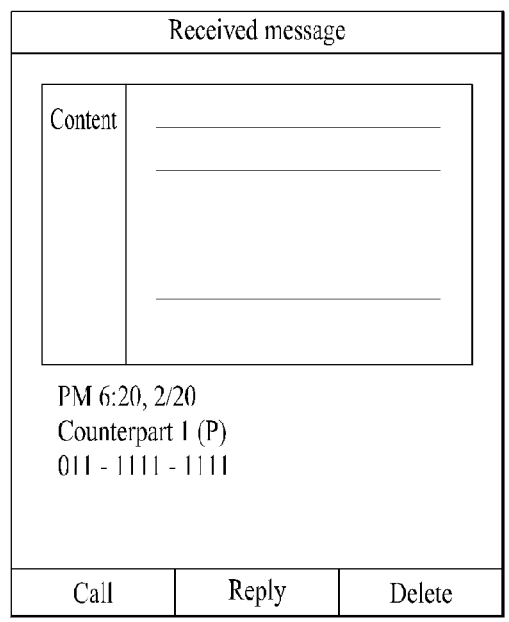

In the following description, running a message application is explained. In this instance, the message application can include a common application common to a private mode and a business mode. FIGS. 23A and 23B are diagrams for identifiably displaying a first information and a second information when running a message application according to an embodiment of the present invention.

Referring to FIG. 23A, the mobile terminal 100 displays a message list including a plurality of messages transceived with a plurality of counterpart terminals and is then able to identifiably display a corresponding mode of each of the messages included in the message list. For instance, a mode corresponding to a message can include a mode corresponding to a counterpart information of a counterpart terminal with which the message is transceived. In order to identifiably display messages, 'B' is marked on a message corresponding to a business mode. In addition, 'P' can be marked on a message corresponding to a private mode.

Referring to FIG. 23b, while a specific message is displayed, the mobile terminal 100 can identifiably display a mode (P) corresponding to the specific message in the course of displaying information on the specific message. Meanwhile, phonebook application embodiments are applicable to a message application.

In the following description, running an email application is explained. In this instance, the email application can include a common application common to a private mode and a business mode.

Figures 24A, 24B:
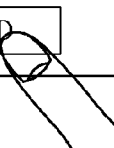

FIGS. 24A to 24C are diagrams for identifiably displaying a first information and a second information when running an email application according to an embodiment of the present invention.

Referring to FIG. 24a, the mobile terminal 100 displays an email writing screen including a recipient information region, an attachment region and a content region. The mobile terminal 100 identifiably displays a corresponding mode (P or B) for a counterpart information included in the recipient information region. The mobile terminal 100 identifiably displays a corresponding mode (B) for an attachment file (Document 1) included in the attachment region. In addition, the mobile terminal 100 displays a corresponding mode (B) for a specific counterpart information (Counterpart 3) included in the content region.

In this instance, a counterpart information on a counterpart, who will receive a currently written email, is displayed on the recipient information region. In addition, a file attached to the currently written email can be displayed on the attachment region.

Referring to FIG. 24B, when a private mode is currently activated, the mobile terminal 100 announces that a transmission to a counterpart corresponding to the private mode is restricted because the attached Document 1 corresponds to a business mode and also enables a user to select one of: (1) No transmission to a counterpart corresponding to the private mode; (2) Transmission after authentication procedure; and (3) Transmission of a partial substance having a security level equal to or lower than a predetermined reference in Document 1. Therefore, the mobile terminal 100 does not transmit Document 1 via an email (1), transmits Document 1 via an email after completion of an authentication procedure (2), or (transmits a partial substance of Document 1 via an email (3), to correspond to the user selection.

Referring to FIG. 24C, when a specific counterpart (Counterpart 1) supposed to receive an email is currently in an email non-receivable state, the mobile terminal 100 converts the email to a message format receivable by the specific counterpart and is then able to send the corresponding message to the specific counterpart. Therefore, the message is sent to the specific counterpart (Counterpart 1), while the email is sent to the rest of the counterpart (Counterpart 2) except the specific counterpart. Meanwhile, the phonebook application embodiments are applicable to an email application as well.

According to an embodiment of the present invention, even if the mobile terminal 100 is not in an application running state, the mobile terminal 100 can identifiably display whether information currently displayed on a screen corresponds to a first mode or a second mode. For instance, the mobile terminal 100 can do so in a home screen state for displaying at least one application identifier.

This is described in detail with reference to FIGS. 25A to 25C as follows. For clarity and convenience of the following description, assume that a first mode and a second mode are a private mode and a business mode, respectively.

Figure 25A:
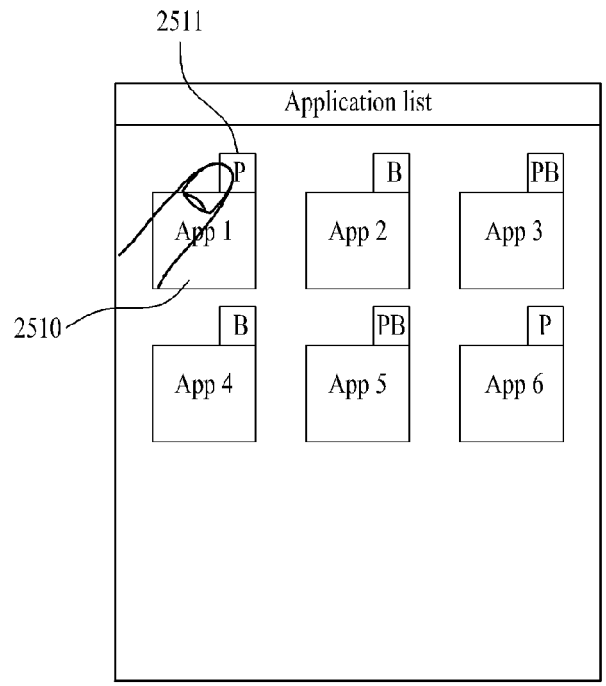
FIGS. 25A to 25C are diagrams for identifiably displaying a corresponding mode per application in the course of displaying an application list according to an embodiment of the present invention.
Figure 25B:
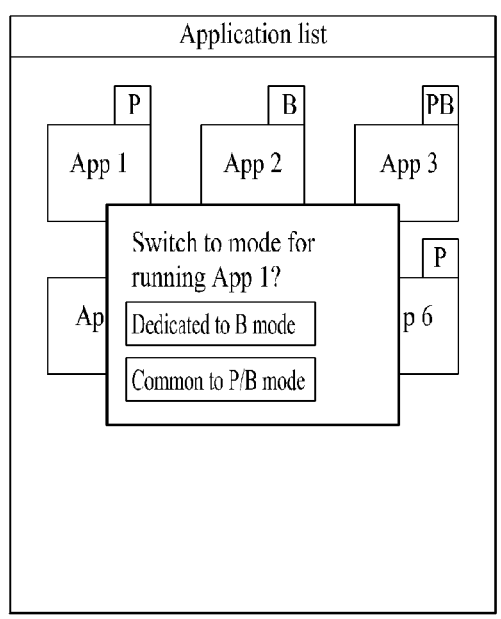
Figure 25C:
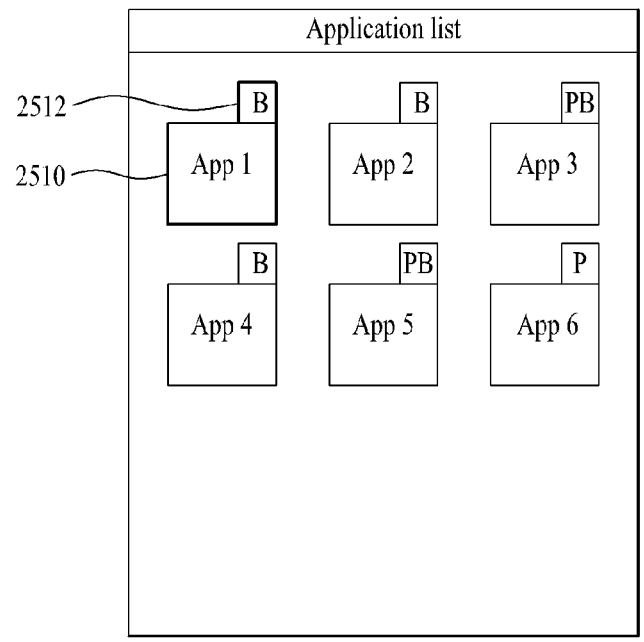
Figure 25C:
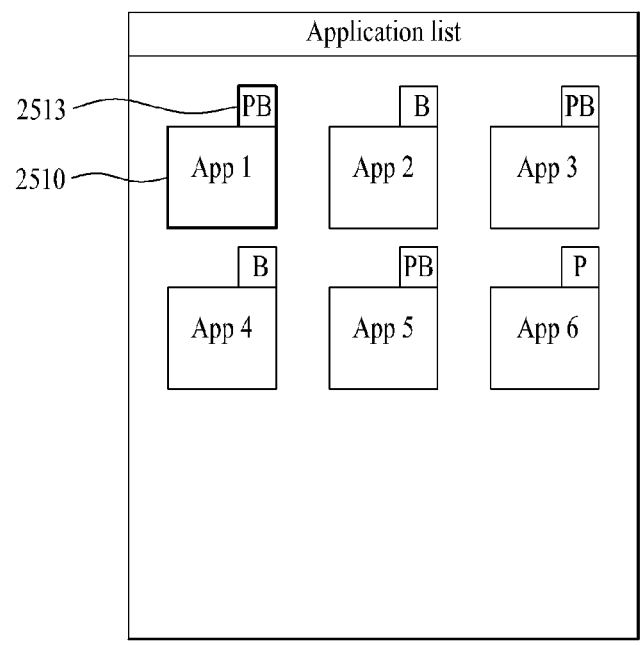

FIGS. 25A to 25C are diagrams for identifiably displaying a corresponding mode per application in the course of displaying an application list according to an embodiment of the present invention. Referring to FIG. 25A, the mobile terminal 100 displays a plurality of application identifiers and can identifiably display a corresponding mode of each of a plurality of the application identifiers. For instance, when a corresponding application is run in a private mode, an indicator 'P' is displayed. In another instance, when a corresponding application is run in a business mode, an indicator IT is displayed. For further instance, when a corresponding application is run in a private mode P and a business mode B in common, an indicator 'PB' is displayed.

Moreover, the mobile terminal 100 provides a toggle key type of the mode identification indicator marked on the corresponding application identifier and is then able to change or switch a corresponding mode.

Referring to FIG. 25B, if an indicator (P) 2511 of a first application identifier 2510 corresponding to a private mode is selected, the mobile terminal 100 enables a user to select whether to change a mode of a first application to correspond to a business mode only (i.e., change into a dedicated application in B mode: Dedicated to B mode) or to both of the private mode and the business mode (i.e., change into a common application common to P mode and B mode: Common to PB mode).

Referring to FIG. 25C, if 'Dedicated to B mode' is selected in FIG. 25B, the mobile terminal 100 dedicatedly designates the first application to the business mode and can give an indicator (B) 2512 to the first application identifier 2510. If 'Common to PB mode' is selected in FIG. 25B, the mobile terminal designates the first application to both of the private mode and the business mode in common and can give an indicator (PB) 2513 to the first application identifier 2510.

According to an embodiment of the present invention, while a first application and a second application are running in a private mode and a business mode, respectively, the mobile terminal 100 can include a key (e.g., a toggle type) for switching an application provided to a private mode screen or a business mode screen. The mobile terminal 100 is then able to switch a running application by manipulating the key for the application switching.

For instance, if the application switching key provided to the private mode screen (or the business mode screen) is manipulated, the mobile terminal 100 stops running the first application. Subsequently, the mobile terminal 100 runs another application different from the first application among applications executable in the private mode (or the business mode) and then displays a corresponding running state on the private mode screen (1) or displays a running state of an application associated with the first application among applications executable in the business mode (or the private mode) on the private mode screen. In this instance, the application associated with the first application can include a first application executable in the business mode if the first application is a common application. Alternatively, if the first application is a dedicated application, the application associated with the first application can include an application having a function identical/similar to that of the first application.

Meanwhile, the modes mentioned in this disclosure can variously include a religion mode, a hobby mode, a school mode and the like per type in addition to a private mode and a business mode. In addition, a plurality of modes can be set for each type.

According to this disclosure, in determining an application running per mode, it can designate an application in accordance with a user selection. In addition, it is also able to automatically designate an application to a corresponding mode in consideration of a property and type of the corresponding application. For instance, assuming that a mode field exists in a data structure of an application, it can designate an application to a corresponding mode defined in the mode field.

In each of a plurality of the modes mentioned in this disclosure, a user interface related to at least one of a voice based communication and a text based communication can be provided via the display unit 151 under the control of the controller 180. For instance, the voice based communication includes a voice call, a voice based chatting and the like. In another instance, the text based communication can include a message service, a text based chatting and the like. The user interface is displayed as a virtual key form on a touchscreen or can be provided as a button key form. In addition, the user interface provided in each of a plurality of modes can differ in position, shape, size and the like.

According to one embodiment of the present invention, the above-described information displaying method of the mobile terminal can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments for the mobile terminal and information displaying method therein are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal, comprising:
a communication unit configured to communicate with at least one other terminal;
a memory configured to store at least first and second operating systems including at least first and second modes, respectively;
a controller configured to execute the first operating system, and to activate the first mode corresponding to the first operating system; and
a display unit configured to display a first information screen corresponding to the activated first mode,
wherein the first information screen includes first application information corresponding to the first mode and second application information corresponding to the second mode and an identifier identifying the first and second application information,
wherein if the second application information is counterpart information, the controller is further configured to control the display unit to display state information of a counterpart terminal corresponding to the counterpart information, and wherein the state information includes at least one of an online status of the counterpart terminal and that the counterpart terminal is currently activating the second mode.

2. The mobile terminal of claim 1, wherein the first information screen including the first application information and the second application information is an integrated same screen.

3. The mobile terminal of claim 1, wherein if the first mode is switched to the second mode or the second mode is switched to the first mode, the controller is further configured to control the display unit to display information reflecting the mode change.

4. The mobile terminal of claim 1, wherein the controller is further configured to receive an input command requesting the controller control the display unit to display the identifier identifying the first and second application information.

5. The mobile terminal of claim 1, wherein the first and second application information includes tag information indicating the first and second application information corresponds to the first and second modes, respectively.

6. The mobile terminal of claim 1, wherein the controller is further configured to control the display unit to partially display some of the second application information corresponding to the second mode while the first mode is currently activated based on at least one of an authentication procedure for displaying the second application information and a prescribed level of content included in the second application information.

7. A mobile terminal, comprising:
a communication unit configured to communicate with at least one other terminal;
a memory configured to store at least first and second operating systems including at least first and second modes, respectively;
a controller configured to execute the first operating system, and to activate the first mode corresponding to the first operating system; and
a display unit configured to display a first information screen corresponding to the activated first mode,
wherein the first information screen includes first application information corresponding to the first mode and second application information corresponding to the second mode and an identifier identifying the first and second application information, and
wherein if the second application information includes a group of counterpart terminals, the controller is further configured to display identification information indicating what mode the counterpart terminals are currently activating.

8. The mobile terminal of claim 1, wherein the controller is further configured to sort the first and second application information according to a prescribed reference.

9. The mobile terminal of claim 1, wherein the controller is further configured to receive a selection signal indicating a selection of the second program information, and to control the display unit to display at least one function that can executed in the second mode.

10. A method of controlling a mobile terminal, the method comprising:
allowing, via a communication unit of the mobile terminal, communication with at least one other terminal;
storing, in a memory of the mobile terminal, at least first and second operating systems including at least first and second modes, respectively;
executing, via a controller of the mobile terminal, the first operating system;
activating, via the controller, the first mode corresponding to the first operating system; and
displaying, on a display unit of the mobile terminal, a first information screen corresponding to the activated first mode,
wherein the first information screen includes first application information corresponding to the first mode and second application information corresponding to the second mode and an identifier identifying the first and second application information,
wherein if the second application information is counterpart information, the method further comprises displaying state information of a counterpart terminal corresponding to the counterpart information, and
wherein the state information includes at least one of an online status of the counterpart terminal and that the counterpart terminal is currently activating the second mode.

11. The method of claim 10, wherein the first information screen including the first application information and the second application information is an integrated same screen.

12. The method of claim 10, wherein if the first mode is switched to the second mode or the second mode is switched to the first mode, the method further comprises displaying information reflecting the mode change.

13. The method of claim 10, further comprising:
receiving, via the controller, an input command requesting the displaying step displays the identifier identifying the first and second application information.

14. The method of claim 10, wherein the first and second application information includes tag information indicating the first and second application information corresponds to the first and second modes, respectively.

15. The method of claim 10, wherein the displaying step comprises partially displaying some of the second application information corresponding to the second mode while the first mode is currently activated based on at least one of an authentication procedure for displaying the second application information and a prescribed level of content included in the second application information.

16. A method of controlling a mobile terminal, the method comprising:
allowing, via a communication unit of the mobile terminal, communication with at least one other terminal;
storing, in a memory of the mobile terminal, at least first and second operating systems including at least first and second modes, respectively;
executing, via a controller of the mobile terminal, the first operating system;
activating, via the controller, the first mode corresponding to the first operating system; and
displaying, on a display unit of the mobile terminal, a first information screen corresponding to the activated first mode,
wherein the first information screen includes first application information corresponding to the first mode and second application information corresponding to the second mode and an identifier identifying the first and second application information, and
wherein if the second application information includes a group of counterpart terminals, the method further comprises displaying identification information indicating what mode the counterpart terminals are currently activating.

17. The method of claim 10, further comprising:
sorting the first and second application information according to a prescribed reference.

18. The method of claim 10, further comprising:
receiving a selection signal indicating a selection of the second program information; and
displaying at least one function that can executed in the second mode.

* * * * *